(12) United States Patent
Fukushima et al.

(10) Patent No.: US 7,653,644 B2
(45) Date of Patent: Jan. 26, 2010

(54) HIERARCHY STRUCTURE DATA GENERATING SYSTEM

(75) Inventors: Minoru Fukushima, Minato-ku (JP); Morikuni Hasegawa, Minato-ku (JP); Shin Takagi, Minato-ku (JP)

(73) Assignee: Hitachi Systems & Services, Ltd., Tokyo (JP)

( * ) Notice: Subject to any disclaimer, the term of this patent is extended or adjusted under 35 U.S.C. 154(b) by 205 days.

(21) Appl. No.: 11/249,339

(22) Filed: Oct. 14, 2005

(65) Prior Publication Data

US 2006/0085467 A1 Apr. 20, 2006

(30) Foreign Application Priority Data

Oct. 14, 2004 (JP) ............... 2004-299792
Oct. 11, 2005 (JP) ............... 2005-296658

(51) Int. Cl.
*G06F 17/00* (2006.01)
(52) U.S. Cl. ............... 707/101; 707/6; 707/200
(58) Field of Classification Search ............... 707/102, 707/101, 6, 200; 715/513
See application file for complete search history.

(56) References Cited

U.S. PATENT DOCUMENTS

| 6,009,436 | A | 12/1999 | Motoyama et al. | |
|---|---|---|---|---|
| 7,281,211 | B2 * | 10/2007 | Jeannette et al. | 715/523 |
| 2004/0060004 | A1 * | 3/2004 | Mani et al. | 715/513 |
| 2004/0073870 | A1 * | 4/2004 | Fuh et al. | 715/513 |
| 2005/0130740 | A1 * | 6/2005 | Onoda et al. | 463/36 |
| 2005/0177543 | A1 * | 8/2005 | Chen et al. | 707/1 |
| 2006/0036612 | A1 * | 2/2006 | Harrop et al. | 707/100 |
| 2006/0041838 | A1 * | 2/2006 | Khan | 715/513 |
| 2006/0117251 | A1 * | 6/2006 | Rothschiller et al. | 715/513 |
| 2006/0129596 | A1 * | 6/2006 | Bays et al. | 707/102 |

FOREIGN PATENT DOCUMENTS

JP 11-272667 10/1999

OTHER PUBLICATIONS

Microsoft dictionary, by Microsoft press, May 1, 2002, definition for hierarchy.*
synonym.com, "Judge" implies "determine".*
synonym.com, "rank " implies "complete".*

(Continued)

*Primary Examiner*—Mohammad Ali
*Assistant Examiner*—Donald Lawson
(74) *Attorney, Agent, or Firm*—Squire, Sanders & Dempsey L.L.P.

(57) ABSTRACT

The mapping data include a substituting element describing area, a repeat number describing area, and a repeat element describing area. In the substituting element describing area, it is described that the input data is set to which tag in the XML file. In the repeat number describing area, the repeat number specified in the repeat number specifying area is described. In the repeat element describing area, it is described that the tag name of the tag output repeatedly in the XML file. The hierarchy structure data generating system outputs the repeat tag to belong to the same rank as the tag of the repeat element describing area. On putting out the repeat tag, the hierarchy structure data generating system outputs it repeatedly the same number of times as the number of the value of the repeat number describing area.

12 Claims, 36 Drawing Sheets

OTHER PUBLICATIONS

Robert Cooley, The Use of Web Structure and Content to Identify Subjectively Interesting Web usage patterns, May 2003, ACM, vol. 3 No. 2, pp. 93-116.*

IEEE, no matched results, Jul. 31, 2009, p. 1.*

Users Manual for VSS-Alpha-ICLUST, 1979, google.com, pp. 1-7.*

* cited by examiner

FIG.1 FUNCTIONAL BLOCK DIAGRAM OF THE 1ST EMBODIMENT

FIG.4A

THE MAPPING DATA M1

| COLUMN 1 | COLUMN 2 |
|---|---|
| [A MAPPING DATA DESCRIBING AREA], | [A MAPPING DATA DESCRIBING AREA], |

FIG.4B

<A SUBSTITUTING ELEMENT DESCRIBING AREA><A REPEAT NUMBER DESCRIBING AREA>
@ <A REPEAT ELEMENT DESCRIBING AREA>

FIG.4C

| COLUMN 1 | COLUMN 2 |
|---|---|
| A(1), — M1 | A(2)@T, — M1 |

FM1

THE REPEAT ELEMENT APPLYING PROCEDURE(2)

FIG.10A

THE XML FILE

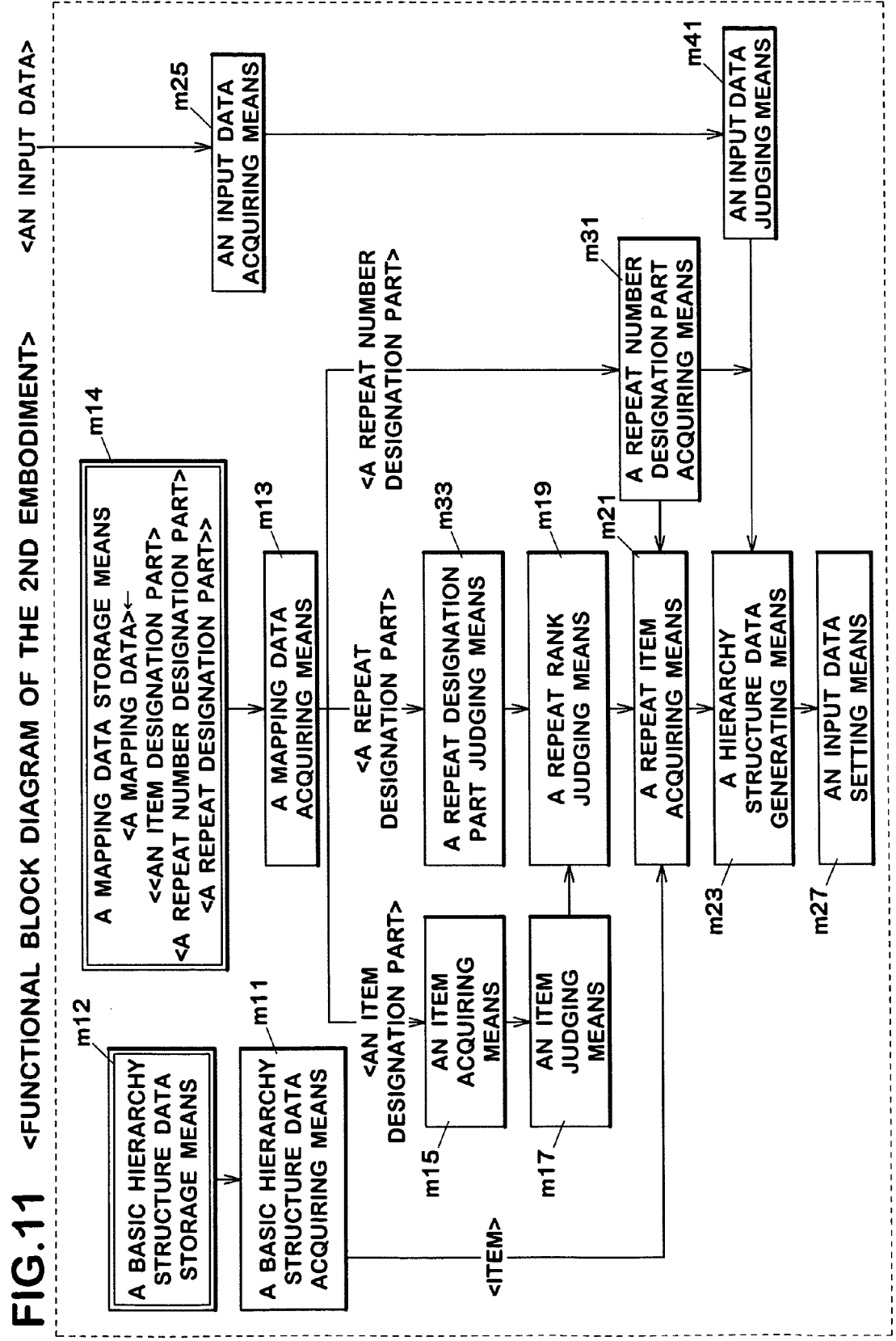

FIG.14A

THE INPUT DATA I3

| | COLUMN 1 | COLUMN 2 |
|---|---|---|
| ROW1 | [A INPUT DATA DESCRIBING AREA], | [A INPUT DATA DESCRIBING AREA], |
| ROW2 | [A INPUT DATA DESCRIBING AREA], | [A INPUT DATA DESCRIBING AREA], |

| | COLUMN 1 | COLUMN 2 |
|---|---|---|
| ROW1 | 100, | 200, |
| ROW2 | 100, | 300, |

I3

FI3

FIG.16 THE REPEAT CONTROL PROCEDURE (1)

FIG.19A

THE XML FILE

FIG.21A   THE XML FILE

THE FORM DATA X11

```
<journalization>
    <journal specification>
        <debtor-creditor></debtor-creditor>
        <account>
            <code></code>
            <name></name>
        </account>
        <amount></amount>
    </journal specification>
</journalization>
```
X11

THE INPUT DATA I11

| | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| ROW1 | NAME(1)@ JOURNAL SPECIFI- CATION | AMOUNT(1) | DEBTOR- CREDITOR (1) | CODE(1)@ JOURNAL SPECIFI- CATION | NAME(1)@ JOURNAL SPECIFI- CATION | AMOUNT(1) | DEBTOR- CREDITOR (1) | CODE(1)@ JOURNAL SPECIFI- CATION |

FM11 (columns 1–4), M11 (columns 5–8)

FIG.24

THE INPUT DATA I11

| COLUMN 1 (NAME) | COLUMN 2 (AMOUNT) | COLUMN 3 (DEBTOR-CREDITOR) | COLUMN 4 (CODE) | COLUMN 5 (NAME) | COLUMN 6 (AMOUNT) | COLUMN 7 (DEBTOR-CREDITOR) | COLUMN 8 (CODE) |
|---|---|---|---|---|---|---|---|
| ACCOUNT RECEIVABLE | 10000 | CREDITOR | 00001 | GOODS ITEM | 10000 | DEBTOR | 00100 |

FI11

I11

FIG.25A
THE XML FILE

```
<journalization>
        <journal specification>
                <debtor-creditor></debtor-creditor>
                <account>
                        <code></code>
                        <name></name>
                </account>
                <amount></amount>
        </journal specification>
</journalization>
```

FIG.25B

```
<journalization>
        <journal specification>
                <debtor-creditor>debtor</debtor-creditor>
                <account>
                        <code></code>
                        <name></name>
                </account>
                <amount></amount>
        </journal specification>
</journalization>
```

FIG.25C

```
<journalization>
        <journal specification>
                <debtor-creditor>debtor</debtor-creditor>
                <account>
                        <code></code>
                        <name></name>
                </account>
                <amount>10000</amount>
        </journal specification>
</journalization>
```

FIG.26

THE XML FILE

```
<journalization>
    <journal specification>
        <debtor-creditor>creditor</debtor-creditor>
        <account>
            <code>00001</code>
            <name>account receivable</name>
        </account>
        <amount>10000</amount>
    </journal specification>
    <journal specification>
        <debtor-creditor>debtor</debtor-creditor>
        <account>
            <code>00100</code>
            <name>goods item</name>
        </account>
        <amount>10000</amount>
    </journal specification>
</journalization>
```

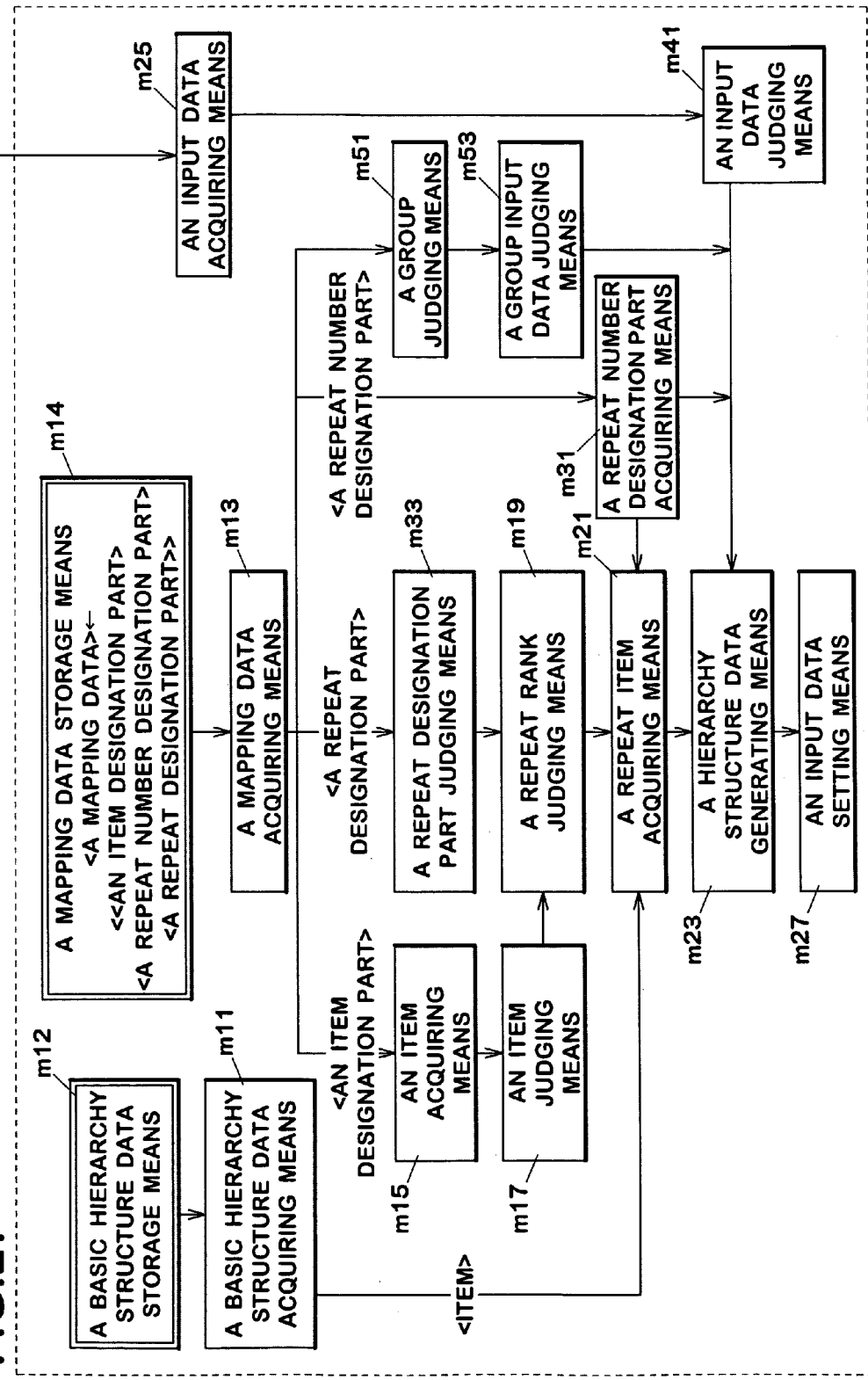
FIG.27 <FUNCTIONAL BLOCK DIAGRAM OF THE 5TH EMBODIMENT>

FIG.28

THE FORM DATA X15

```
<sales>
    <date of shipment></date of shipment>
    <customer>
        <cutomer code></custmoer code>
        <custmoer name></custmoer name>
    </custmoer>
    <description>
        <goods item>
            <goods code></goods code>
            <goods name></goods name>
        </goods item>
        <quantity></quantity>
        <unit price></unit price>
        <date of an order></date of an order>
    </description>
</sales>
```

THE MAPPING DATA M15

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| GOODS NAME @ DESCRIPTION | QUANTITY | UNIT PRICE | GOODS CODE @ DESCRIPTION | DATE OF AN ORDER | CUSTOMER NAME @ SALES | CUSTOMER CODE @ SALES | DATE OF SHIPMENT |

THE INPUT DATA I15

| | COLUMN 1 (GOODS NAME) | COLUMN 2 (QUANTITY) | COLUMN 3 (UNIT PRICE) | COLUMN 4 (GOODS CODE) | COLUMN 5 (DATE OF AN ORDER) | COLUMN 6 (CUSTOMER NAME) | COLUMN 7 (CUSTOMER CODE) | COLUMN 8 (DATE OF SHIPMENT) |
|---|---|---|---|---|---|---|---|---|
| ROW1 | PC-A, | 1, | 150000, | 000200, | 2005/04/24 | A COMPANY, | 000102 | 2005/04/26, |
| ROE2 | PC-B, | 2, | 120000, | 000300, | 2005/04/25 | A COMPANY, | 000102 | 2005/04/26, |

FIG.31 THE OPERATION OF THE HIERARCHY STRUCTURE DATA GENERATING SYSTEM 21

FIG.33A

| TAG | REPEAT ELEMENT | THE CURRENT ROW'S VALUE | THE FRONT ROW'S VALUE |
|---|---|---|---|
| <date of shipment></date of shipment> | SALES | | |
| <customer code></customer code> | SALES | | |
| <customer name></customer name> | SALES | | |
| <goods code></goods code> | DESCRIPTION | | |
| <goods name></goods name> | DESCRIPTION | | |
| <quantity></quantity> | DESCRIPTION | | |
| <unit price></unit price> | DESCRIPTION | | |
| <date of an order></date of an order> | DESCRIPTION | | |

FIG.33B

| TAG | REPEAT ELEMENT | THE CURRENT ROW'S VALUE | THE FRONT ROW'S VALUE |
|---|---|---|---|
| <date of shipment></date of shipment> | SALES | 2005/04/26 | 0 |
| <customer code></customer code> | SALES | 000102 | 0 |
| <customer name></customer name> | SALES | A COMPANY | 0 |
| <goods code></goods code> | DESCRIPTION | 000200 | 0 |
| <goods name></goods name> | DESCRIPTION | PC-A | 0 |
| <quantity></quantity> | DESCRIPTION | 1 | 0 |
| <unit price></unit price> | DESCRIPTION | 150000 | 0 |
| <date of an order></date of an order> | DESCRIPTION | 2005/04/24 | 0 |

FIG.33C

| TAG | REPEAT ELEMENT | THE CURRENT ROW'S VALUE | THE FRONT ROW'S VALUE |
|---|---|---|---|
| <date of shipment></date of shipment> | SALES | 2005/04/26 | 2005/04/26 |
| <customer code></customer code> | SALES | 000102 | 000102 |
| <customer name></customer name> | SALES | A COMPANY | A COMPANY |
| <goods code></goods code> | DESCRIPTION | 000300 | 000200 |
| <goods name></goods name> | DESCRIPTION | PC-B | PC-A |
| <quantity></quantity> | DESCRIPTION | 1 | 1 |
| <unit price></unit price> | DESCRIPTION | 120000 | 150000 |
| <date of an order></date of an order> | DESCRIPTION | 2005/04/25 | 2005/04/24 |

FIG.35A

THE XML FILE

```
<sales>
    <date of shipment>2005/04/26</date of shipment>
    <customer>
        <cutomer code>000102</custmoer code>
        <custmoer name>A company</custmoer name>
    </custmoer>
    <description>
        <goods item>
            <goods code>000200</goods code>
            <goods name>PC-A</goods name>
        </goods item>
        <quantity>1</quantity>
        <unit price>150000</unit price>
        <date of an order>2005/4/24</date of an order>
    </description>
</sales>
```

FIG.35B

```
<sales>
    <date of shipment>2005/04/26</date of shipment>
    <customer>
        <cutomer code>000102</custmoer code>
        <custmoer name>A company</custmoer name>
    </custmoer>
    <description>
        <goods item>
            <goods code>000200</goods code>
            <goods name>PC-A</goods name>
        </goods item>
        <quantity>1</quantity>
        <unit price>150000</unit price>
        <date of an order>2005/4/24</date of an order>
    </description>
    <description>
        <goods item>
            <goods code>000300</goods code>
            <goods name>PC-b</goods name>
        </goods item>
        <quantity>1</quantity>
        <unit price>120000</unit price>
        <date of an order>2005/4/24</date of an order>
    </description>
</sales>
```

PRIOR ART

HIERARCHY STRUCTURE DATA GENERATING SYSTEM

CROSS-REFERENCE TO RELATED APPLICATION

The entire disclosure of Japanese patent application No. 2004-299792 filed on Oct. 14, 2004 including the specification, claims, drawings and summary are incorporated herein by reference. The entire disclosure of Japanese patent application No. 2005-296658 filed on Oct. 11, 2005 including the specification, claims, drawings and summary are also incorporated herein by reference.

BACKGROUND OF THE INVENTION

1. Field of the Invention

This invention relates to a hierarchy structure data generating system, particularly to process repeat input procedures easily.

2. Description of the Related Art

There has been a mapping method which targets a data element including the each value and a structured file having a hierarchy structure generated by upper-lower relations between each data element, and the mapping method where some values is acquired, these values are mapped for each data element of the structured file, and output the structured file including the data value. In this mapping method, there has been conventionally provided and used a programming language by which mapping procedures of the structured file can be described because of describing procedures and data structures to convert and/or transcribe input data to output data element.

In addition, predetermining the form data of the outputting structured file and a placeholder to designate the insertion position of the input data value in the form data, the template function, which processes automatically the convert procedures according to the definition of the form data, has been provided and used with the programming language.

By using this template function, it will be easy to describe the mapping procedures with using the programming language because there is no requirement to describe the procedures to convert and/or transcribe input data to output data element.

A conventional mapping method of the structured file is described in FIG. 36. The conventional mapping method is realized by using a series of the input data 105 (the CSV file, or the like), a mapping system 106, structured file 107, a form data 107, and a form data 108.

In the conventional mapping method, when a user needs to control partially the application of the form data 108 when the user outputs the each input data, the user describes control statements to control the application of the form data 108.

However, the conventional mapping method which describes the control statement by the programming language with use of the template function has problems as described below. When a user intends to correspond the repeat data input procedure, like as processing the specification line data in the document processing procedures, to one of the placeholder of the form data and output part of the form data repeatedly, the user needs to describe procedural control statements by the programming language to control the partial application of the form data 108. Consequently, it takes a lot of trouble with describing the control statement by the programming language.

Another problem is that the mixed description of the form data and the control statement spoils the simplicity, the clearness, and/or, the easiness to understand of the description of the form data and the control statement.

SUMMARY OF THE INVENTION

The object of the invention is to provide a hierarchy structure data generating system capable of solving the problems above without describing the control statement in order to output part of the form data repeatedly and spoiling the simplicity, the clearness, and/or, the easiness to understand of the description of the form data and the control statement because of the mixed description of the form data and the control statement.

A hierarchy structure data generating system according to the present invention, which generates a hierarchy structure data where an item generating the hierarchy structure and an input data are related, comprising;

a basic hierarchy structure data acquiring means that acquires a basic hierarchy structure data to designate a hierarchy structure generated by one or plural items;

a mapping data acquiring means that acquires a mapping data comprising an item designation part and a repeat designation part, the item designation part that designates which input data relates to which item, the repeat designation part that designates in which rank of the hierarchy structure the item designated in the item designation part is output repeatedly;

an item acquiring means that acquires the item from the basic hierarchy data;

an item judging means that judges whether the item designated in the item designation part of the mapping data corresponds to the item acquires from the basic hierarchy structure data;

a repeat rank judging means that judges the rank designated in the repeat designation part of the mapping data as the repeat rank if the item designated in the item designation part of the mapping data corresponds to the item acquires from the basic hierarchy structure data;

a repeat item acquiring means that acquires the item corresponding to the repeat rank as the repeat item from the basic hierarchy structure data; and a hierarchy structure data generating means that generates the hierarchy structure data according to the acquired repeat item.

A method of generating a hierarchy structure data according to the present invention, the method comprising the steps of:

acquiring a basic hierarchy structure data to designate a hierarchy structure generated by one or plural items;

acquiring a mapping data comprising an item designation part and a repeat designation part, the item designation part that designates which input data relates to which item, the repeat designation part that designates in which rank of the hierarchy structure the item designated in the item designation part is output repeatedly;

acquiring the item from the basic hierarchy data;

judging whether the item designated in the item designation part of the mapping data corresponds to the item acquires from the basic hierarchy structure data;

judging the rank designated in the repeat designation part of the mapping data as the repeat rank if the item designated in the item designation part of the mapping data corresponds to the item acquires from the basic hierarchy structure data;

acquiring the item corresponding to the repeat rank as the repeat item from the basic hierarchy structure data; and generating the hierarchy structure data according to the acquired repeat item.

Although the features of the invention are broadly described above, the configuration and contents of the invention together with its object and features will be clearer understood from the following disclosure in reference to the appended drawings.

Here, the correlation of components mentioned in the claims with the components in the embodiment will be described. The basic hierarchy structure data acquiring means corresponds to the CPU 211 and the memory 212; the basic hierarchy structure data storage means to the hard disk drive 213; the mapping data acquiring means to the CPU 211 and the memory 212; the mapping data storage means to the hard disk drive 213; the item acquiring means to the CPU 211 and the memory 212; the item judging means to the CPU 211 and the memory 212; the repeat rank judging means to the CPU 211 and the memory 212; the repeat item acquiring means to the CPU 211 and the memory 212; the hierarchy structure data generating means to the CPU 211 and the memory 212; the repeat number acquiring means to the CPU 211 and the memory 212; the repeat designation judging means to the CPU 211 and the memory 212; the input data acquiring means to the CPU 211 and the memory 212; the input data setting means to the CPU 211 and the memory 212; the input data judging means to the CPU 211 and the memory 212; the group judging means the CPU 211 and the memory 212; and the group input data judging means to the CPU 31 and the memory 212, respectively.

The hierarchy structure data corresponds to the XML file (see FIGS. 10, 19, 21, 25, 26, 35); the input data to the input data I1, I3, I11, I15; the basic hierarchy structure data to the form data X1, X3, X5, X11, X15; and the mapping data to the mapping data M1, M3, M5, M11, M15, respectively.

The item designation part corresponds to the substituting element describing area; the repeat number designation part to the repeat number describing area, and the repeat designation part to the repeat number describing area, respectively.

The input data file corresponds to the input data file FI1, FI3, FI11, FI15; the input data describing area to the input data describing area in the input data file FI1, FI3, FI11, FI15; the mapping data file to the mapping data file FM1, FMI3, FM5, FM11, FM15; and the mapping data describing area to the mapping data describing area in the mapping data file FM1, FM3, FM5, FM11, FM15, respectively.

The item generating the hierarchy structure corresponds to the tag described by the XML language; the repeat rank to the rank which the tag corresponding to the repeat element belongs to; and the repeat item to the repeat tag, respectively.

BRIEF DESCRIPTION OF THE DRAWINGS

FIG. 4A shows the data structure of the mapping data file FM1.

FIG. 4B shows the data structure of the mapping data M1.

FIG. 4C shows the concrete data structure of the mapping data file FM1 and the mapping data M1.

FIG. 10A shows a generated XML file in the first embodiment.

FIG. 10B shows a generated XML file in the first embodiment.

FIG. 11 is a functional block diagram, showing a second embodiment of a hierarchy structure data generating system according to the invention.

FIG. 14A shows the data structure of the input data file FI3.

FIG. 14B shows the concrete data structure of the input data file FI3 and the input data I3.

FIG. 19A shows a generated XML file in the second embodiment.

FIG. 19B shows a generated XML file in the second embodiment.

FIG. 19C shows a generated XML file in the second embodiment.

FIG. 19D shows a generated XML file in the second embodiment.

FIG. 21A shows a generated XML file in the third embodiment.

FIG. 21B shows a generated XML file in the third embodiment.

FIG. 21C shows a generated XML file in the third embodiment.

FIG. 22 shows the concrete data structure of the form data X1.

FIG. 23 shows the concrete data structure of the mapping data file FM11 and the mapping data M11.

FIG. 24 shows the concrete data structure of the input data file FI11 and the input data I11.

FIG. 25A shows a generated XML file in the forth embodiment.

FIG. 25B shows a generated XML file in the forth embodiment.

FIG. 25C shows a generated XML file in the forth embodiment.

FIG. 26 shows a generated XML file in the forth embodiment.

FIG. 27 is a functional block diagram, showing a fifth embodiment of a hierarchy structure data generating system according to the invention.

FIG. 28 shows the concrete data structure of the form data X15.

FIG. 29 shows the concrete data structure of the mapping data file FM15 and the mapping data M15.

FIG. 30 shows the concrete data structure of the input data file FI15 and the input data I11.

FIG. 33 shows a group table.

FIG. 35A shows a generated XML file in the fifth embodiment.

FIG. 35B shows a generated XML file in the fifth embodiment.

DESCRIPTION OF PREFERRED EMBODIMENTS

First Embodiment

1. Functional Block Diagram

Figure 1:
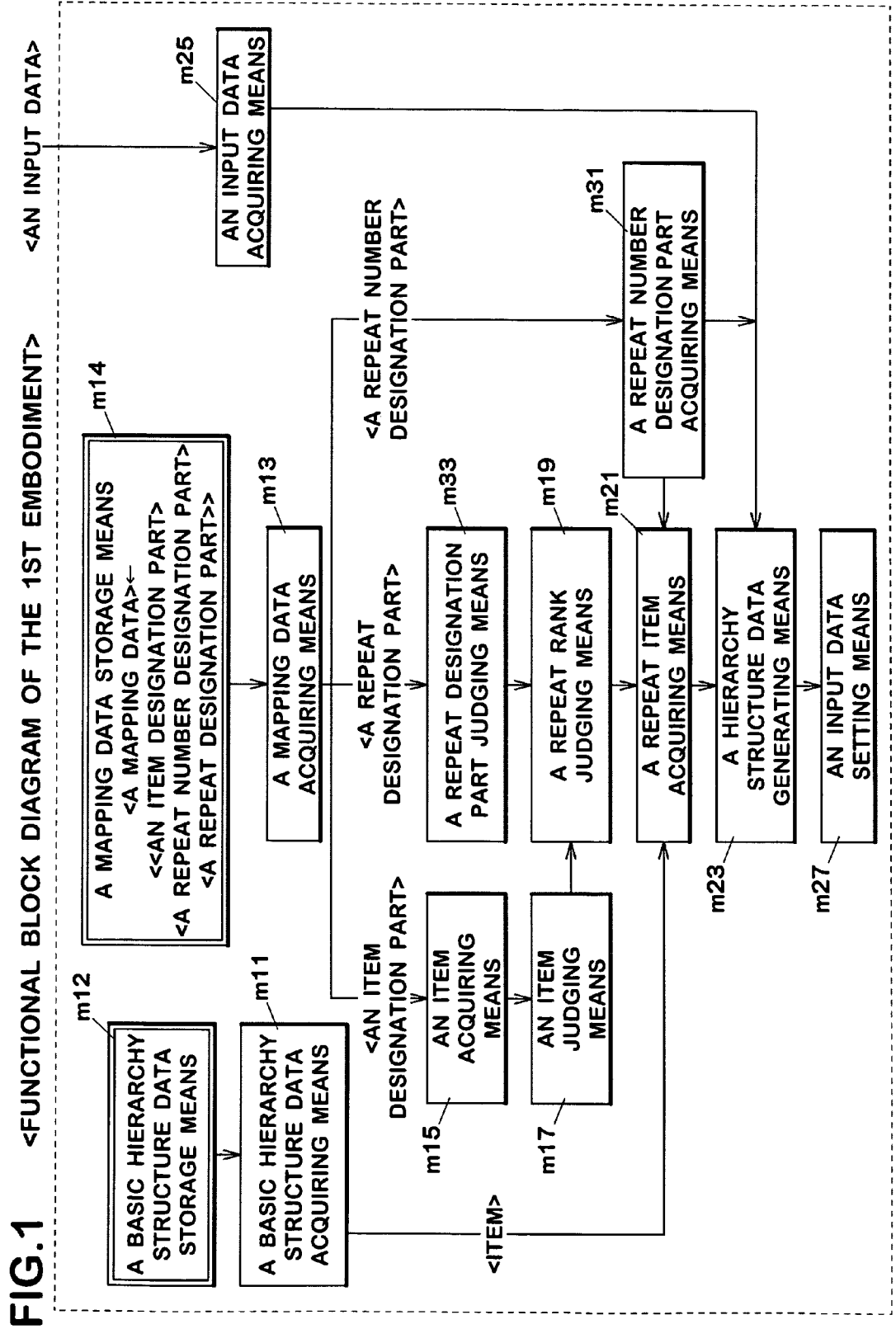
FIG. 1 is a functional block diagram, showing a first embodiment of a hierarchy structure data generating system according to the invention.

A functional block diagram of a hierarchy structure data generating system of the invention will be described in reference to FIG. 1 which shows a basic hierarchy structure data acquiring means m11, a basic hierarchy structure data storage means m12, a mapping data acquiring means m13, a mapping data storage means m14, an item acquiring means m15, an item judging means m17, a repeat rank judging means m19, a repeat item acquiring means m21, a hierarchy structure data generating means m23, an input data acquiring means m25, an input data setting means m27, a repeat number designation part acquiring means m31, a repeat designation part judging means m33.

The basic hierarchy structure data acquiring means m11 acquires a basic hierarchy structure data to designate a hierarchy structure generated by one or plural items.

The basic hierarchy structure data storage means m12 stores the basic hierarchy structure data.

The mapping data acquiring means m13 acquires a mapping data comprising an item designation part and a repeat designation part, the item designation part that designates which input data relates to which item, the repeat designation part that designates in which rank of the hierarchy structure the item designated in the item designation part is output repeatedly.

The mapping data storage means m14 stores the mapping data.

The item acquiring means m15 acquires the item from the basic hierarchy data.

The item judging means m17 judges whether the item designated in the item designation part of the mapping data corresponds to the item acquired from the basic hierarchy structure data.

The repeat rank judging means m19 judges the rank designated in the repeat designation part of the mapping data as a repeat rank if the item designated in the item designation part of the mapping data corresponds to the item acquired from the basic hierarchy structure data. Further, the repeat number designation part acquiring means m31 judges, when judged the vale is set up in the repeat designation part, the rank designated in the repeat designation part of the mapping data as the repeat rank if the item designated in the item designation part of the mapping data corresponds to the item acquires from the basic hierarchy structure data, and, when judged the vale is NOT set up in the repeat designation part, judges a predetermined rank for the item designated in the item designation part as the repeat rank.

The repeat item acquiring means m21 acquires the item corresponding to a repeat rank as the repeat item from the basic hierarchy structure data.

The hierarchy structure data generating means m23 generates the hierarchy structure data according to the acquired repeat item. Further, the hierarchy structure data generating means m23 generates the hierarchy structure data where the repeat item is output repeatedly the same number of times as the number of value in the repeat number designation part.

The input data acquiring means m25 acquires the input data.

The input data setting means m27 sets the input data related to the mapping data to the item corresponding to the item designation part of the mapping data.

The repeat number designation part acquiring means m31 acquires the repeat number designation part, the repeat number designation part designates how many times the item corresponding to the item designation part is output repeatedly. Further, the repeat number designation part acquiring means m31 sets "1" as the value of the repeat number designation part when judged the value dose NOT set up in the repeat number designation part.

The repeat designation judging means m33 judges whether the value sets up in the repeat number designation part.

2. Hardware Constitution

Figure 2:
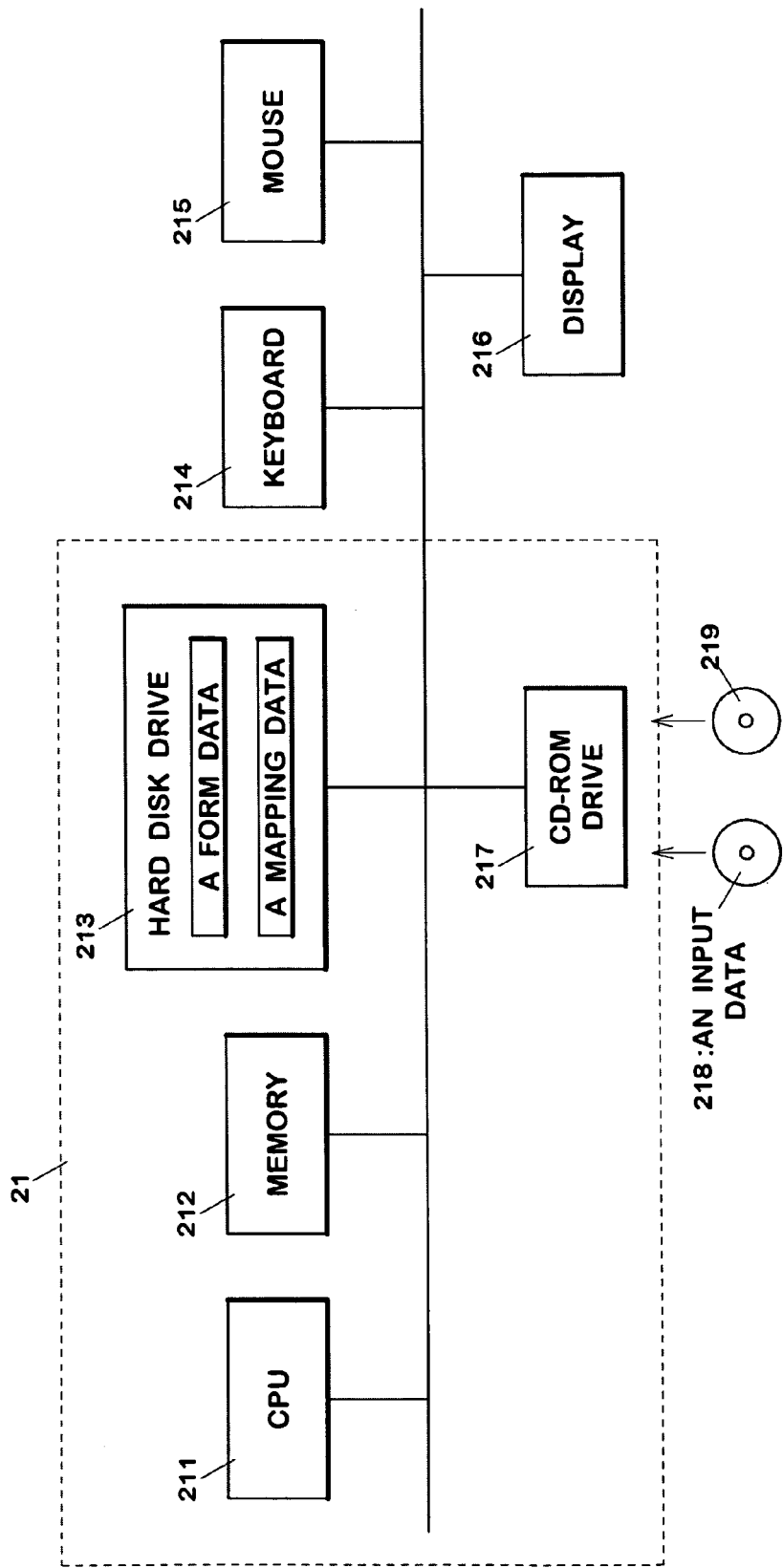
FIG. 2 shows a hardware arrangement of the hierarchy structure data generating system.

The hardware arrangement of the hierarchy structure data generating system 21 is shown in FIG. 2. The hierarchy structure data generating system 21 includes a CPU 211, a memory 212, and a hard disk drive 213. The hierarchy structure data generating system 21 also has external devices connected to itself: a keyboard 214, a mouse 215, a display 216, and a CD-ROM drive 217.

The CPU 211 executes processing based on the operating system program (OS), a hierarchy structure data generating program and other application program stored in the hard disk drive 213. The memory 212 provides working storages for the CPU211. The hard disk drive 213 stores the OS program, a hierarchy structure data generating program and other application program. Meanwhile a form data and a mapping data to be stored in the hard disk drive 213, are described later. The CD-ROM drive 217 reads input data stored in a CD-ROM 218, and the hierarchy structure data generating program and other data stored in a CD-ROM 219.

The keyboard 214 and the mouse 215 receive external instructions. The display 216 displays such graphics data as a user interface.

1. Data

The form data, the mapping data, stored in the hard disk drive 213 of the hierarchy structure data generating system 21, and the input data, acquiring through the CD-ROM drive 217, will be described.

1.1. Form Data

The form data is the data that indicates the basic hierarchy structure constituted by one or more tags. An XML file corresponding to the input data will be generated according to the hierarchy structure the form data includes. The form data is described in a form data file FX1.

Figure 3:
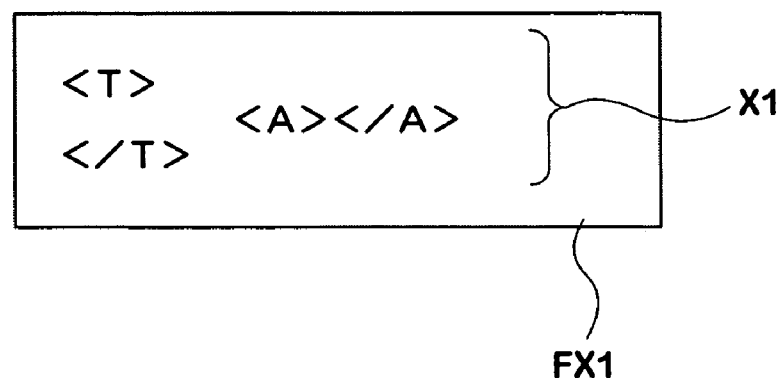
FIG. 3 shows the data structure of the form data X1.

The form data X1 in this embodiment is described in FIG. 3. The form data X1 is described using XML (eXtend Markup Language). The form data X1 includes one or more tags such as <T> </T>, <A> </A>.

Each tag generates the hierarchy structure. In the form data X1 the tags belonging to the top rank are tag <T>, </T>. The tags belonging to the next rank to the top rank are tag <A>, </A>.

Each tag has a tag name describing area between '<' and '>'. In the case of tag <A>, the value of the tag name describing area is 'A'.

1.2. Mapping Data

The mapping data is the data that indicates means the one basic hierarchy structure constituted by one or more tag. A XML file corresponding to the input data will be generated according to the hierarchy structure the form data includes. The mapping data is described in a mapping data file FM1.

The data structure of the mapping data file FM1 in this embodiment is described in FIG. 4A. The mapping data file includes a one or more mapping data describing area. Each mapping data describing area is identified by a column. The mapping data is described in the mapping data describing area.

The data structure of the mapping data M1 in this embodiment is described in FIG. 4B. The mapping data include a substituting element describing area, a repeat number describing area, and a repeat element describing area. In the substituting element describing area, it is described that the input data is set to which tag in the XML file.

In the repeat number describing area, the repeat number specified in the repeat number specifying area is described. In this embodiment the repeat number describing area is defined between the sign "(" and ")". Therefore, by using the predetermined sign to discriminate the repeat number describing area, the position of the repeat number describing area in the mapping data is cleared.

In the repeat element describing area, it is described that the tag name representing the tag output repeatedly in the XML file. In this embodiment the sign "@" is placed between the repeat number describing area and the repeat element describing area. Therefore, by using the predetermined sign to discriminate the repeat element describing area, the position of the repeat element describing area in the mapping data can be cleared.

The mapping data file FM1 includes two mapping data describing areas, as described in FIG. 4C. In the mapping data describing area corresponding to column 1 the mapping data M1 "A1(1)" is described, and in the mapping data describing area corresponding to column 2 the mapping data M1 "A(2) @T" is described.

1.3. Input Data

The input data means the data designating the value assigned actually to the tag of XML file. The input data is described in an input data file.

Figure 5A:
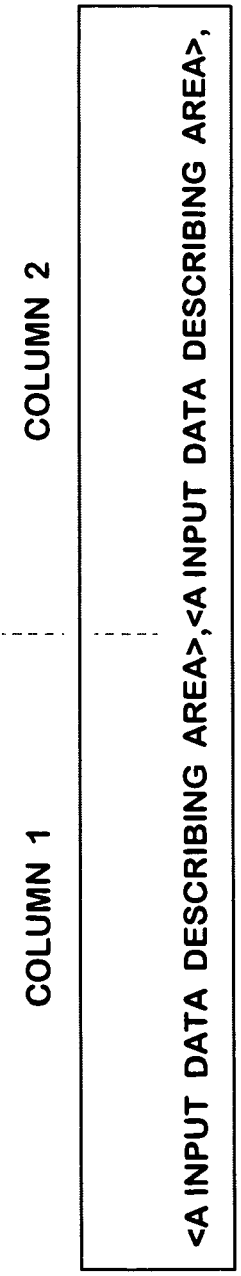
FIG. 5A shows the data structure of the input data file FI1.

The data structure of the input data file FI1 in this embodiment is described in FIG. 5A. The input data file includes one or more input data describing area. Each input data describing area is identified by a column. Each input data describing area is arranged serially in a line. The input data is described in the input data describing area.

Figure 5B:
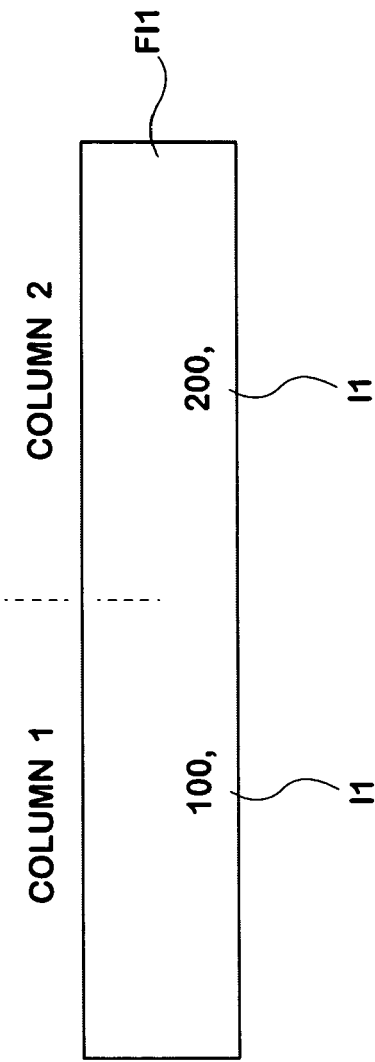
FIG. 5B shows the concrete data structure of the input data file FI1 and the input data I1.

The input data file FI1 includes two input data describing areas, as described in FIG. 5B. In the input data describing area corresponding to column 1 the input data I1 "100" is described, and in the input data describing area corresponding to column 2 the input data I1 "200" is described, respectively.

The input data describing area of the input data file FI1 corresponds to the mapping data describing area of the mapping data file FM1. That is, the input data I1 "100" corresponds to the column 1 of the input data file FM1 corresponds to the mapping data M1 "A(1)" corresponding to the column 1 of the mapping data file FM1, and the input data I1 "200" corresponding to the column 2 of the input data file FM1 corresponds to the mapping data M1 "A(2)@T" corresponding to the column 2 of the mapping data file FM1, respectively.

2. Operation of the Hierarchy Structure Data Generating System 21

2.1. Basic Procedure 2.1.1. Summary of the Basic Procedure

The basic operation of the hierarchy structure data generating system 21 will be described in FIG. 6.

Figure 6:
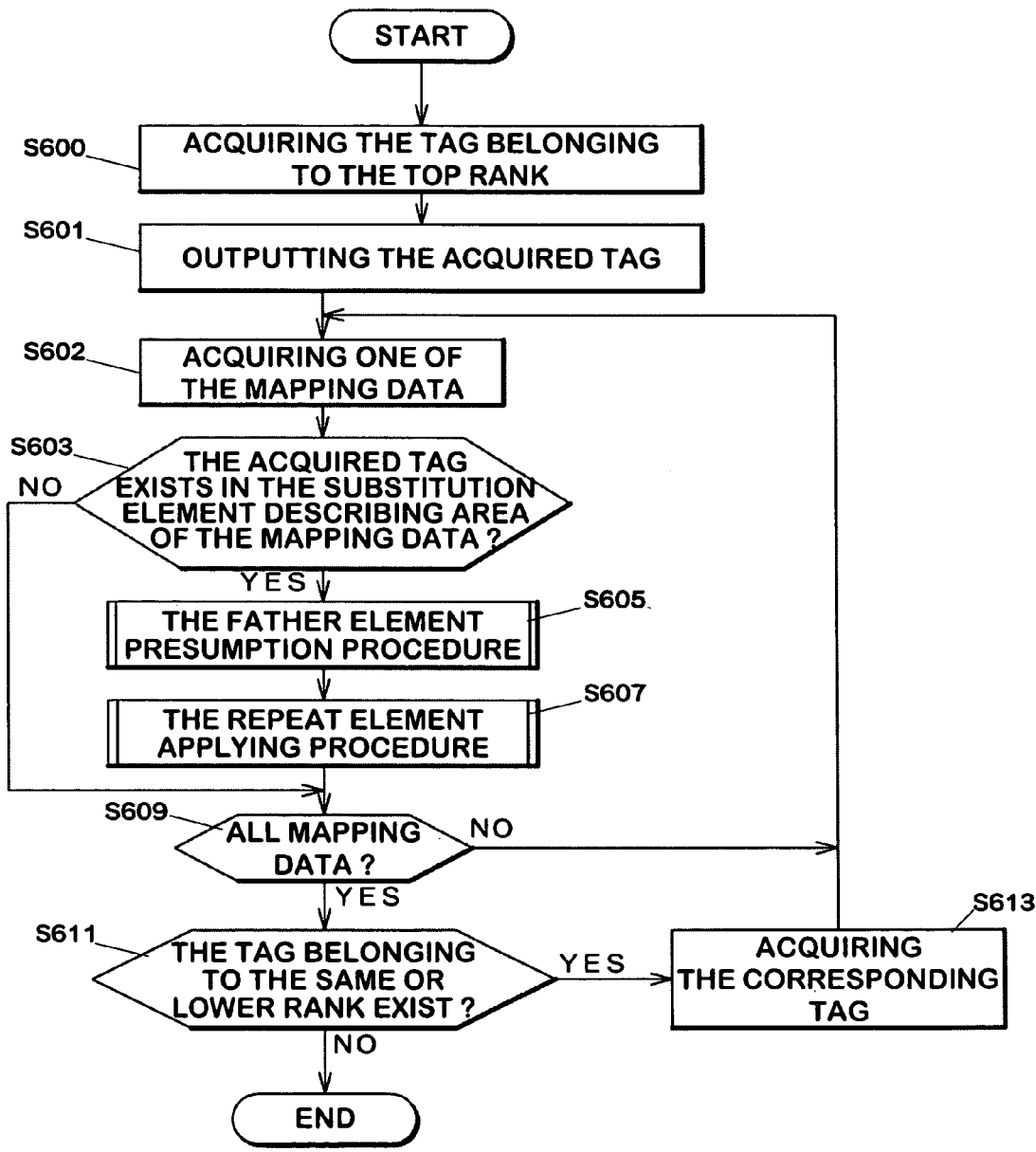
FIG. 6 shows a flow chart of the operation of the hierarchy structure data generating system 21 in the first embodiment.

As shown in FIG. 6, the CPU211 of the hierarchy structure data generating system 21 acquires the tags belonging to the top rank from the form data file FX1, stored in the hard disk drive 213 (S600). Next, the CPU211 outputs the acquired tag to the XML file (S601).

The CPU211 acquires one of the mapping data M1 from the mapping data file FM1 stored in the hard disk drive213 (S602). The CPU 211 judges whether or not the tag acquired in the step S601 exists in the substitution element describing area of the mapping data acquired in the step S602 (S603).

When judged in the step S603 that the tag acquired in the step S601 exists in the substitution element describing area of the mapping data acquired in the step S602, the CPU 211 processes a father element presumption procedure (S605). Afterward, the CPU 211 processes a repeat element applying procedure (S607).

On the other hand, when judged in the step S603 that the tag acquired in the step S601 does NOT exist in the substitution element describing area of the mapping data acquired in the step S602, the CPU 211 judges whether or not the procedure in the step S603 has been processed for all mapping data M1 described in the mapping data file FM1 (S609).

When judged that the procedure in the step S603 has NOT been processed for all mapping data in the step S609, the CPU 211 acquires another mapping data M1 (S602). The CPU 211 repeats the steps from S603 to S609.

When judged that the procedure in the step S603 has been processed for all mapping data in the step S609, the CPU 211 judges whether or not the tag exists in the form data X1 which belongs to the same rank or the next lower rank than the tag acquired in the step S601 (S611). The CPU 211 acquires the tag belonging to the same rank or the next lower rank than the tag acquired in the step S601 (S613). The CPU 211 processes the procedure following to the step S603 for the tag acquired in the step S613. When judged the tag does NOT exist in the form data X1 which belongs to the same rank or the next lower rank than the tag acquired in the step S601, the CPU 211 finishes the procedure.

2.1.2. Illustrative Embodiment

The operation of the hierarchy structure data generating system 21 is described concretely using the form data (refer to FIG. 3) and the mapping data (refer to FIG. 4). The CPU211 acquires the tags <T> </T> belonging to the top rank at the form data file FX1 (S600). Then, the CPU211 outputs the acquired tag <T> </T> to the XML file (S601).

The CPU211 acquires one of the mapping data M1 "A(1)" from the mapping data file FM1 stored in the hard disk drive213 (S602). The CPU 211 judges whether or not the value "T" of the tag name describing area in the tag <T> acquired in the step S601 is the same as the value "A" of the substitution element describing area of the mapping data "A(1)" acquired in the step S602 (S603). In this case, the CPU 211 judges that the value "T" of the tag name describing area at the tag <T> is NOT the same as the value "A" of the substitution element describing area of the mapping data "A(1)".

The CPU 211 judges that the judgment in the step S603 has NOT been processed for the other mapping data M1 "A(2)@T" (S609). Next, the CPU211 acquires the mapping data M1 "A(2)@T" (S602). The CPU 211 judges that the value "T" of the tag name describing area at the tag <T> is NOT the same as the value "A" of the substitution element describing area of the mapping data "A(2)@T" (S603). And, the CPU 211 judges that the judgment in the step S603 has been processed for all mapping data M1 described in the mapping data file FM1 (S609).

Next, the CPU 211 judges whether or not the tag exists in the form data X1 which belongs to the same rank or the next lower rank than the tag <T> (S611). In this case, the CPU 211 judges that the tag exists in the form data X1 which belongs to the same rank or the next lower rank than the tag <T>. The CPU 211 acquires the tag <A> (S613).

The CPU 211 acquires one of the mapping data M1 "A(1)" from the mapping data file FM1 (S602). The CPU 211 judges whether or not the value "A" of the tag name describing area at the tag <A> acquired in the step S601 is the same as the value "A" of the substitution element describing area of the mapping data "A(1)" acquired in the step S602 (S603). In this case, the CPU 211 judges that the value "A" of the tag name describing area at the tag <A> is the same as the value "A" of the substitution element describing area of the mapping data "A(1)".

The CPU 211 processes the father element presumption procedure (S605) and the repeat element applying procedure (S607).

Also, for the other mapping data "A(2)@T", the CPU 211 processes the father element presumption procedure (S605) and the repeat element applying procedure (S607).

Figure 7:
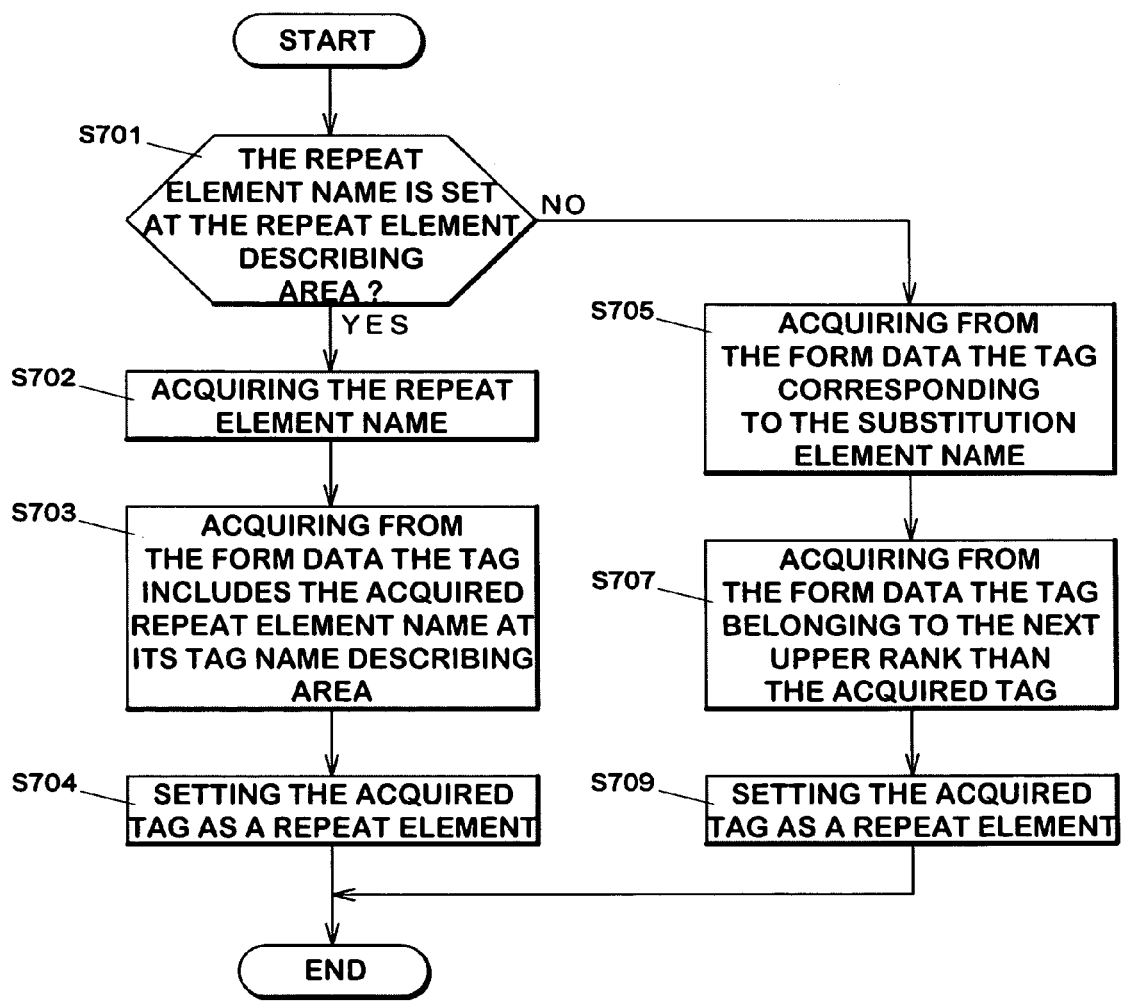
FIG. 7 shows a flow chart for processing the father element presumption procedure.

2.2. Father Element Presumption Procedure 2.2.1. Summary of the Father Element Presumption Procedure The steps of the father element presumption procedure (S605: see FIG. 6) are described using the flow chart shown in FIG. 7.

The CPU 211 judges whether or not the repeat element name is set at the repeat element describing area in the mapping data M1 (S701). When judged that the repeat element name is set in the repeat element describing area, the CPU 211 acquires the repeat element name (S702). The CPU 211 acquires from the form data the tag includes the acquired repeat element name in its tag name describing area (S703). The CPU 211 sets the acquired tag as a repeat element (S704).

On the other hand, when judged that the repeat element name is NOT set in the repeat element describing area, the CPU 211 acquires from the form data the tag corresponding to the substitution element name described at the substitution element describing area of the mapping data M1 (S705). The CPU 211 acquires from the form data the tag belonging to the next upper rank than the acquired tag (S707). The CPU 211 sets the acquired tag as a repeat element (S709).

The CPU 211 stores the repeat element in the memory 212.

2.2.2. Illustrative Embodiment

The father element presumption procedure is described concretely using the form data (refer to FIG. 3) and the mapping data (refer to FIG. 4). The CPU 211 judges that the repeat element name is set in the repeat element describing area of the mapping data M1 "A(1)" (S701). Then, the CPU 211 acquires from the form data X1 the tag corresponding to the substitution element name "A" described at the substitution element describing area of the mapping data M1 "A(1)" (S705). The CPU 211 acquires the tag "<T>" belonging to the next upper rank than the acquired tag "A" (S707). The CPU 211 sets the acquired tag "<T>" for a repeat element (S709).

The CPU 211 judges that the repeat element name is set in the repeat element describing area in the mapping data M1 "A(2)@T" (S701). The CPU 211 acquires the repeat element name "T" (S702). The CPU 211 acquires from the form data X1 the tag "<T>" includes the acquired repeat element name "T" at its tag name describing area (S703). The CPU 211 sets the acquired tag "<T>" for the repeat element (S704).

Figure 8:
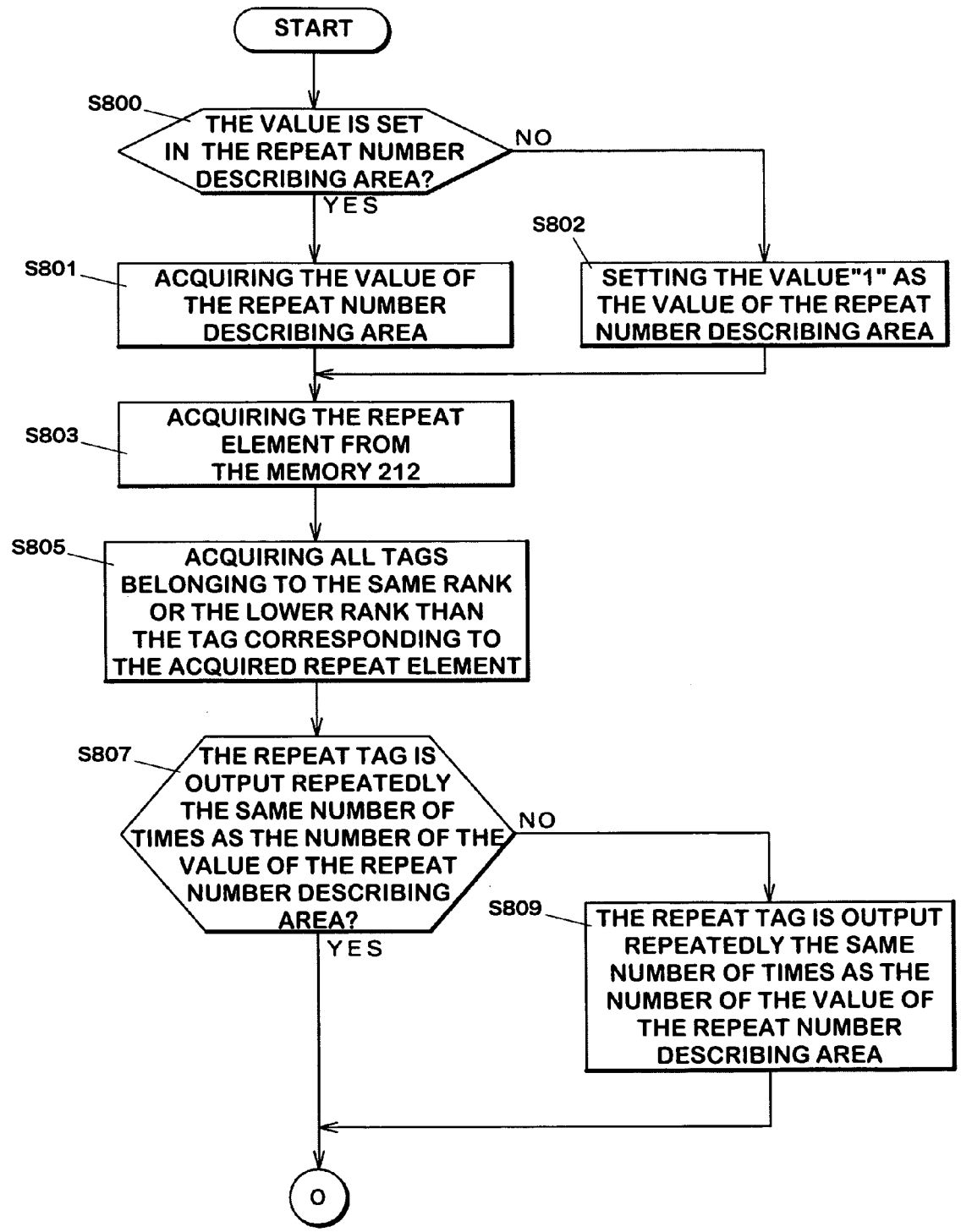
FIG. 8 shows a flow chart for processing the repeat element applying procedure.

2.3. Repeat Element Applying Procedure 2.3.1. Summary of the Father Element Presumption Procedure The steps of the repeat element applying procedure (S607: see FIG. 6) are described using the flow chart shown in FIG. 8, FIG. 9.

The CPU 211 judges whether or not the value is set in the repeat number describing area as targeted in this procedure (S800). When judged the value is set in the repeat number describing area, the CPU 211 acquires the value of the repeat number describing area of the mapping data as an object of this procedure (S801).

On the other hand, when judged the value is set in the repeat number describing area, the CPU 211 sets the value "1" as the value of the repeat number describing area and acquires the value "1" (S802).

The CPU 211 acquires the repeat element from the memory 212 (S803). The CPU 211 acquires all tags as a repeat tag from the form data file FM1, the tags belong to the same rank as the tag corresponding to the acquired repeat element (a repeat rank) and to the lower rank than the repeat rank (S805).

The CPU 211 judges whether or not the repeat tag is output repeatedly the same number of times as the number of the value of the repeat number describing area acquired in the step S801 (S807).

When judged that the repeat tag is NOT output repeatedly the same number of times as the number of the value of the repeat number describing area acquired in the step S801, the CPU 211 outputs the repeat tag to belong to the same rank as the tag stored as the repeat element. On putting out the repeat tag, the CPU 211 outputs it repeatedly the same number of times as the number of the value of the repeat number describing area (S809). Furthermore, on putting out the repeat tag, the CPU 211 does NOT output the tag which is already output to the XML file.

Figure 9:
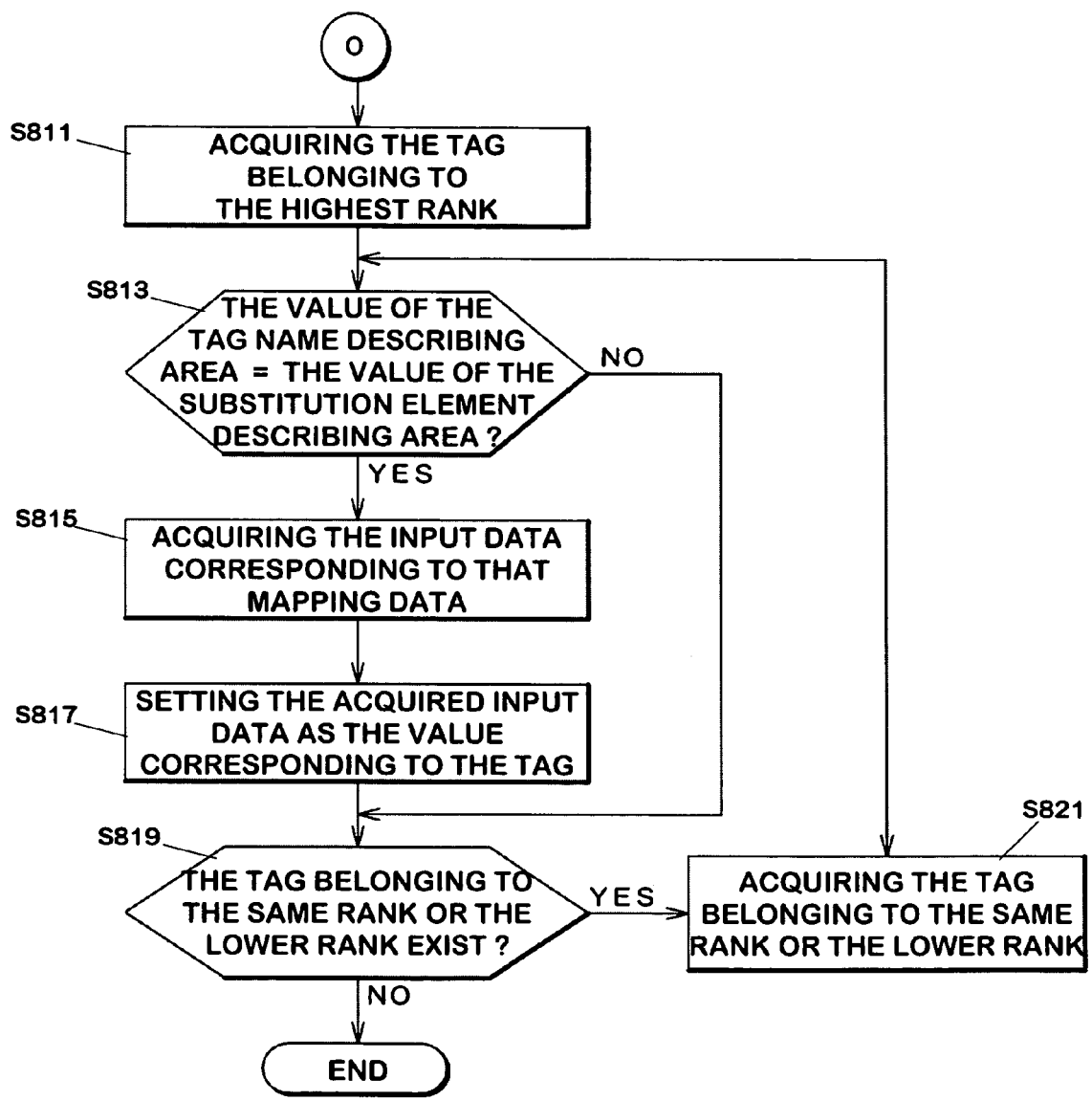
FIG. 9 shows a flow chart for processing the repeat element applying procedure.

As shown in FIG. 9, when judged in the step S807 that the repeat tag is output repeatedly the same number of times as the number of the value of the repeat number describing area acquired in the step S801, the CPU 211 acquires the tag which belongs to the highest rank among the repeat tag (S811). The CPU 211 judges whether or not the value of the tag name describing area of the acquired tag is the same as the value of the substitution element describing area of the mapping data as an object of this procedure (S813). When judged that the value of the tag name describing area is the same as the value of the substitution element describing area at the mapping data as an object of this procedure, the CPU 211 acquires from the input data file FI1 the input data corresponding to the mapping data (S815). The CPU 211 sets the acquired input data as the value corresponding to the tag judged the same in the step S813 to the XML file (see FIG. 8 S809) having been output the tags which belong to the lower rank than the tags corresponding to the repeat element (S817).

When judged in the step S813 that the acquired tag is the same as the value of the substitution element describing area at the mapping data as an object of this procedure, the CPU 211 judges whether or not the tag exists in the form data X1 which belongs to the same rank or the lower rank than the tag acquired in the step S811 (S819). When judged that the tag exists in the form data X1 which belongs to the same rank or the lower rank than the tag acquired in the step S811, the CPU 211 acquires the tag belonging to the same rank or the lower rank than the tag acquired in the step S811 (S821). The CPU 211 processes the procedure following the step S813 for the acquired tag.

2.3.2. Illustrative Embodiment

Here, the repeat element applying procedure is described concretely using the form data (referred to FIG. 3) and the mapping data (referred to FIG. 4). First, the repeat element procedure is shown using the mapping data M1 "A(1)", the CPU 211 acquired in the step S602.

The CPU 211 judges whether or not the value is set in the repeat number describing area of the mapping data M1 "A(1)" (S800). When judged the value is set in the repeat number describing area of the mapping data M1 "A(1)", the CPU 211 acquires the value "1" of the repeat number describing area of the mapping data M1 "A(1)" (S801).

Then, the CPU 211 acquires the value of the repeat element "<T>" corresponding to the mapping data M1 "A(1)" from the memory 212 (S803). The CPU 211 acquires the tags "<T> <A> </A> </T>" as the repeat tag from the form data file FX1, the tags "<T><A></A></T>" belong to the same rank as the tag "<T>" corresponding to the acquired repeat element (the repeat rank) and the lower rank than the repeat rank (S805).

Thereafter, the CPU 211 judges whether or not the repeat tag "<T> <A> </A> </T>" is output repeatedly to the XML file the same number of times as the number of the value "1" of the number describing area of the mapping data "A(1)" (S807).

When judges that the repeat tag "<T> <A> </A> </T>" is NOT output to the XML file "1" times repeatedly, the CPU 211 outputs the repeat tag to belong to the same rank as the tag stored as the repeat element. On outputting the repeat tag "<T> <A> </A> </T>", the CPU 211 puts it out the value of the repeat number describing area times repeatedly (S809). Furthermore, on outputting the repeat tag "<T> <A> </A> </T>", the CPU 211 does NOT output the tags "<T>. </T>" which are already output to the XML file.

The CPU 211 acquires one of the tag "<T>" which belongs to the highest rank in the repeat tag "<T> <A> </A> </T>" (S811). The CPU 211 judges whether or not the value "T" of the tag name describing area of the acquired tag "<T>" is the same as the value "A" of the substitution element describing area of the mapping data "A(1)" as an object of this procedure (S813).

When judged in the step S813 that the value "T" of the tag name describing area in the acquired tag "<T>" is NOT the same as the value "A" of the substitution element describing area at the mapping data "A(1)", the CPU 211 judges whether or not the tag exists in the form data X1 which belongs to the same rank or the lower rank than the tag "<T>" acquired in the step S811 (S819). When judged that the tag "<A>" belonging to the lower rank than the tag "<T>" exists in the form data X1, the CPU 211 acquires the tag "<A>" (S821). When judged that the value "A" of the tag name describing area of the acquired tag "<A>" is the same as the value "A" of the substitution element describing area at the mapping data "A(1)" as an object of this procedure, the CPU 211 acquires from the input data file FI1 the input data "100" corresponding to the mapping data "A(1)" (S815). The CPU 211 sets the acquired input data "100" as the value corresponding to the tag "<A>" judged the same in the step S813 to the XML file generated in the step S809 (S817). The XML file generated so far is shown FIG. 10A.

Next, the repeat element procedure is shown using the mapping data M1 "A(2)@T" which the CPU 211 acquired next to the mapping data M1 "A(1)".

The CPU 211 acquires the value "2" of the repeat number describing area of the mapping data "A(2)@T" (S801).

The CPU 211 acquires the repeat element "<T>" corresponding to the mapping data M1 "A(2)@T" from the memory 212 (S803). The CPU 211 acquires all the tags "<T> <A> </A> </T>" as the repeat tag from the form data file FM1, the tags belongs to the same rank as the tag"<T>" corresponding to the acquired repeat element (the repeat rank) and to the lower rank than the repeat rank (S805).

The CPU 211 judges whether or not the repeat tag "<T> <A> </A> </T>" is output repeatedly to the XML file the same number of times as the number "2" of the value of the repeat number describing area of the mapping data M1 "A(2) @T" (S807).

As shown in FIG. 10A, the repeat tag "<T> <A> </A> </T>" is described only 1 time in the XML file. So, when judged that the repeat tag "<T> <A> </A> </T>" is NOT output repeatedly to the XML file the same number of times as the number of the value "2" of the number of the repeat number describing area acquired step S801, the CPU 211 outputs the repeat tag "<T> <A> </A> </T>" to belong to the same rank as the tag "<T>" stored as the repeat element. On outputting the repeat tag, the CPU 211 outputs it "2" times repeatedly (S809). The XML file is shown in FIG. 10B.

Second Embodiment

1. Summary

In the first embodiment, the input data is composed of the single line. In this embodiment, however, the input data is composed of plural lines. Furthermore, the form data and the mapping data are different from the first embodiment. The form data, the mapping data, and the input data are described in the following.

In this embodiment, the hardware structure is the same as the first embodiment. Hereinafter, for the same hardware structure and the same procedure, same numbers are given as in the first embodiment.

A hierarchy structure data generating system of the invention will be described in reference to FIG. 11 which shows a basic hierarchy structure data acquiring means m11, a basic hierarchy structure data storage means m12, a mapping data acquiring means m13, a mapping data storage means m14, a item acquiring means m15, a item judging means m17, a repeat rank judging means m19, a repeat item acquiring means m21, a hierarchy structure data generating means m23, a input data acquiring means m25, a input data setting means m27, a repeat number designation part acquiring means m31, a repeat designation part judging means m33, a input data judging means m41.

The input data judging means m41 judges whether the first input data is the same as the second input data, the first input data is the input data described in the input data describing area identified by a specific row and a specific column, the second input data is the input data described in the input data describing area identified by the front row and the same column

2. Data

The form data, the mapping data, and the input data will be described. The form data and the mapping data are stored in the hard disk drive 213 of the hierarchy structure data generating system of this embodiment. The input data is acquired through the CD-ROM drive 217.

2.1 Form Data

Figure 12:
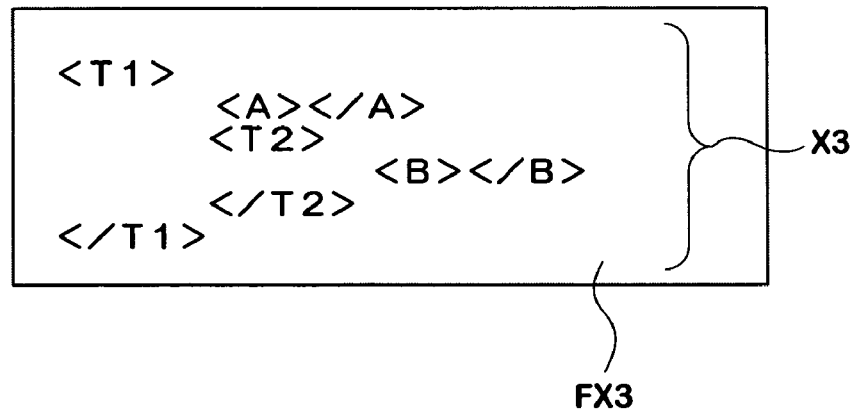
FIG. 12 shows the concrete data structure of the form data X3.

The form data X3 in this embodiment is described in FIG. 12. The form data X3 is described using XML. The form data X3 is described in a form data file FX3.

The form data X3 includes one or more tags such as <T1>, </T1>, <A>, </A>, <T2>, </T2>, <B> and </B>.

Each tag generates hierarchy structure. In the form data X3 the tags belonging to the top rank are <T1>, </T1>. The tags belonging to the next rank to the top rank are <A>, </A>, <T2>, and </T2>. The tags belonging to the last rank are <B> and </B>.

2.2 Mapping Data

Figure 13:
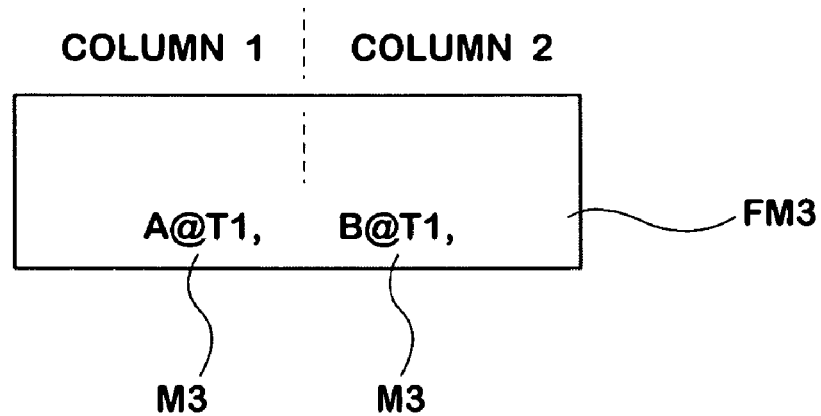
FIG. 13 shows the concrete data structure of the mapping data file FM3 and the mapping data M3.

The mapping data M3 in this embodiment is described in FIG. 13. The mapping data M3 is described in a mapping data file FM3.

In the mapping data file FM3, the two columns (column 1, column 2) are set up. In column 1 of the mapping data file FM3, the mapping data M3 "A@T1" is set up. In column 2 of the mapping data file FM3, the mapping data M3 "B@T1" is set up.

2.3 Input Data

The data structure of the input data file FI3 is described in FIG. 14A. The input data file FI3 is composed of plural lines. Each line includes a one or more input data describing area. It means, each input data describing area is identified by a row and a column. The input data is described in the input data describing area.

The input data file FI3 of this embodiment is described in FIG. 14B. The input data file FI3 is composed of two lines. In each line, two columns (column 1, column2) are set up.

In the input data describing area corresponding to row 1, column 1, the input data I3 "100" is described. In the input data describing area corresponding to row 1, column 2, the input data I3 "200" is described. In the input data describing area corresponding to row 2, column 1, the input data I3 "100" is described. In the input data describing area corresponding to row 2, column 2, the input data I3 "300" is described.

As well as the first embodiment, the input data describing area of the input data file FI1, identified by a column, corresponds to the mapping data describing area of the mapping data file FM3, identified by its column. The input data I3 "100", identified by row 1, column 1 of the input data file FI3, and the input data I3 "100", identified by row 2, column 1 of the input data file FM3 correspond to the mapping data M3 "A@T1" identified by column 1 of the mapping data file FM3. The input data I3 "200", identified by row 1, column 2 of the input data file FI3, and the input data I3 "300", identified by row 2, column 2 of the input data file FM3 correspond to the mapping data M3 "B@T1" identified by column 2 of the mapping data file FM3.

3. Operation of the Hierarchy Structure Data Generating System 21

3.1 Basic Procedure

3.1.1 Summary of the Basic Procedure

The operation of the hierarchy structure data generating system 21 will be described using the flowchart shown in FIG. 15. The CPU211 acquires the values corresponding to the first row of the input data file FI3 (S1401).

After that, the CPU 211 processes the procedures from the step S601 to the step S613 as in the first embodiment so as to generate the XML file based on the input data I3 in which the acquired values corresponding to the first row is included. Here, the detailed description regarding the procedures from the step S601 to the step S613 will be omitted because they are the same as in the first embodiment.

The CPU211 acquires from the input data file FI3 the values corresponding to the next row to the row including the value acquired in the step S1401 (S1403). The CPU 211 processes a repeat control procedure to the values of the row acquired in the step S1403 (S1405). The repeat control procedure is described in the following.

The CPU 211 processes the procedures of the step S1403 and step S1405 to all the rows except the first row of the input data file FI3 (S1407).

3.1.2 Illustrative Embodiment

The operation of the hierarchy structure data generating system 21 is described concretely using the form data X3 (refer to FIG. 12), the mapping data M3 (refer to FIG. 13) and the input data I3 (refer to FIG. 14).

The CPU211 acquires the input data I3 "100, 200" set up in the row 1 of the input data file FI3 (S1401). The CPU211 processes the procedure from the step S601 to the step S613 for the mapping data M3 "A@T1", "B@T1". The hierarchy structure of the XML file at this stage is described in FIG. 19A.

The CPU211 acquires from the input data file FI3 the input data I3 "100, 300" of the row 2 corresponding to the next row to the row 1 including the input data I3 "100, 200" acquired in the step S1401 (S1403). The CPU 211 processes a repeat control procedure to the input data I3 "100, 300" of the row acquired in the step S1403 (S1405). The hierarchy structure of the XML file at this stage is described in FIG. 19B.

3.2 Repeat Control Procedure

3.2.1 Summary of the Repeat Control Procedure

The operation of the repeat control procedure (S1405, FIG. 15) will be described using the flowchart shown in FIG. 16 to FIG. 18.

Figure 15:
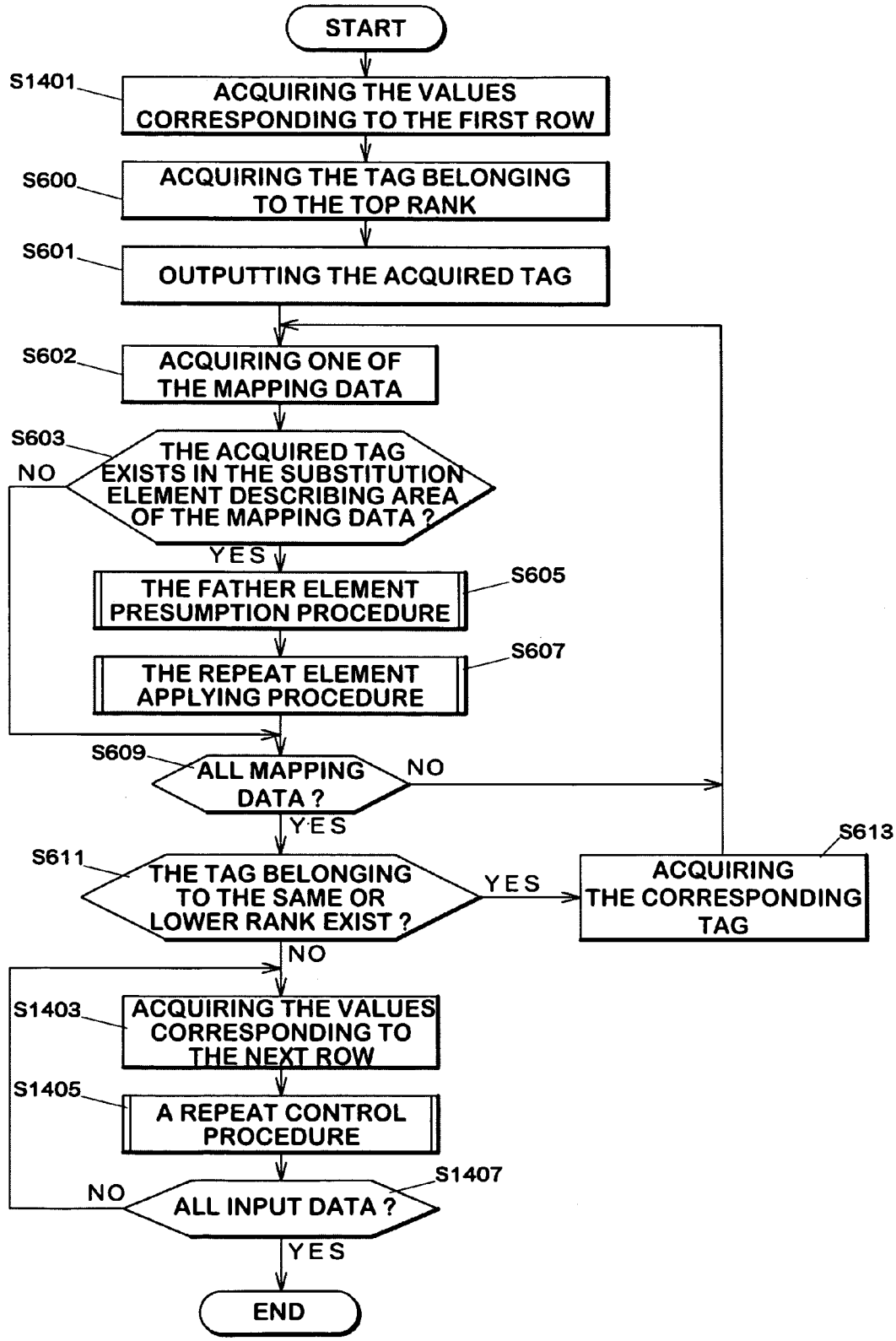
FIG. 15 shows a flow chart of the operation of the hierarchy structure data generating system 21 in the second embodiment.
Figure 16:
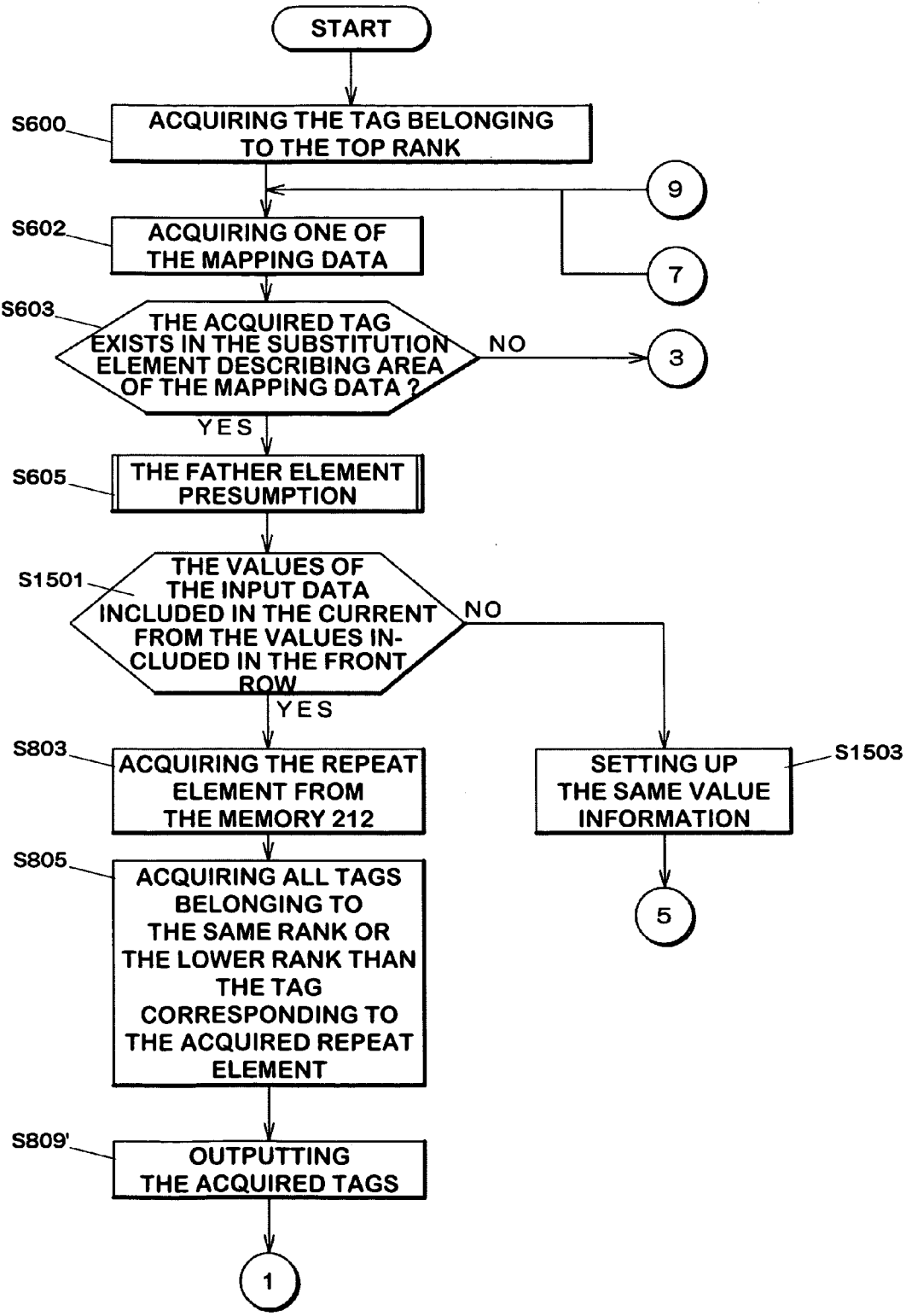
FIG. 16 shows a flow chart for processing the repeat control procedure.

As shown in FIG. 16, the CPU211 processes the procedures from the step S601 to the step S605 (see FIG. 6) to the input data I3 in the row acquired in the step S1405 (see FIG. 15).

Finishing the father element presumption procedure in the step S605, the CPU 211 judges whether or not the values of the input data I3, included in the row acquired in the step S1403, corresponding to the mapping data M3 acquired in the step S601 is different from the values included in the row positioned in front of the row acquired in the step S1403, corresponding to that mapping data M3 (S1501). When judged that the values included in the row acquired in the step S1403 is NOT different from the values included in the row positioned before the row acquired in the step S1403, it means, both values are the same, the CPU 211 sets up the same value information (S1503). As shown in FIG. 18.

When judged that the existence judgment has been processed for all mapping data the step S609, the CPU 211 judges whether or not the tag exists in the form data X3 which belongs to the same rank or the next lower rank than the tag belonging to the highest rank of the tags acquired in the step S601 or the step S (S611) When judged that the tag belonging to the same rank or the lower rank exists, the CPU 211 acquired the said tag (S613). The CPU 211 processes the following procedures to the acquired tag.

Returning to FIG. 16, when judged in the step S1501 that the values of the input data I3, included in the row acquired in the step S1403, corresponding to the mapping data M3 acquired in the step S601 is different from the values included in the row positioned before the row acquired in the step S1403, corresponding to the said mapping data M3, the CPU 211 acquires the value of the repeat element from the memory 212 (S803). The CPU 211 acquires all the tags as a repeat tag from the form data file FX3, the tags belong to the same rank as the tag corresponding to the acquired repeat element (a repeat rank) and to the lower rank than the repeat rank (S805). The CPU 211 outputs to the XML file the repeat tag repeatedly to belong to the same rank as the tag stored as the repeat element (S809').

Figure 17:
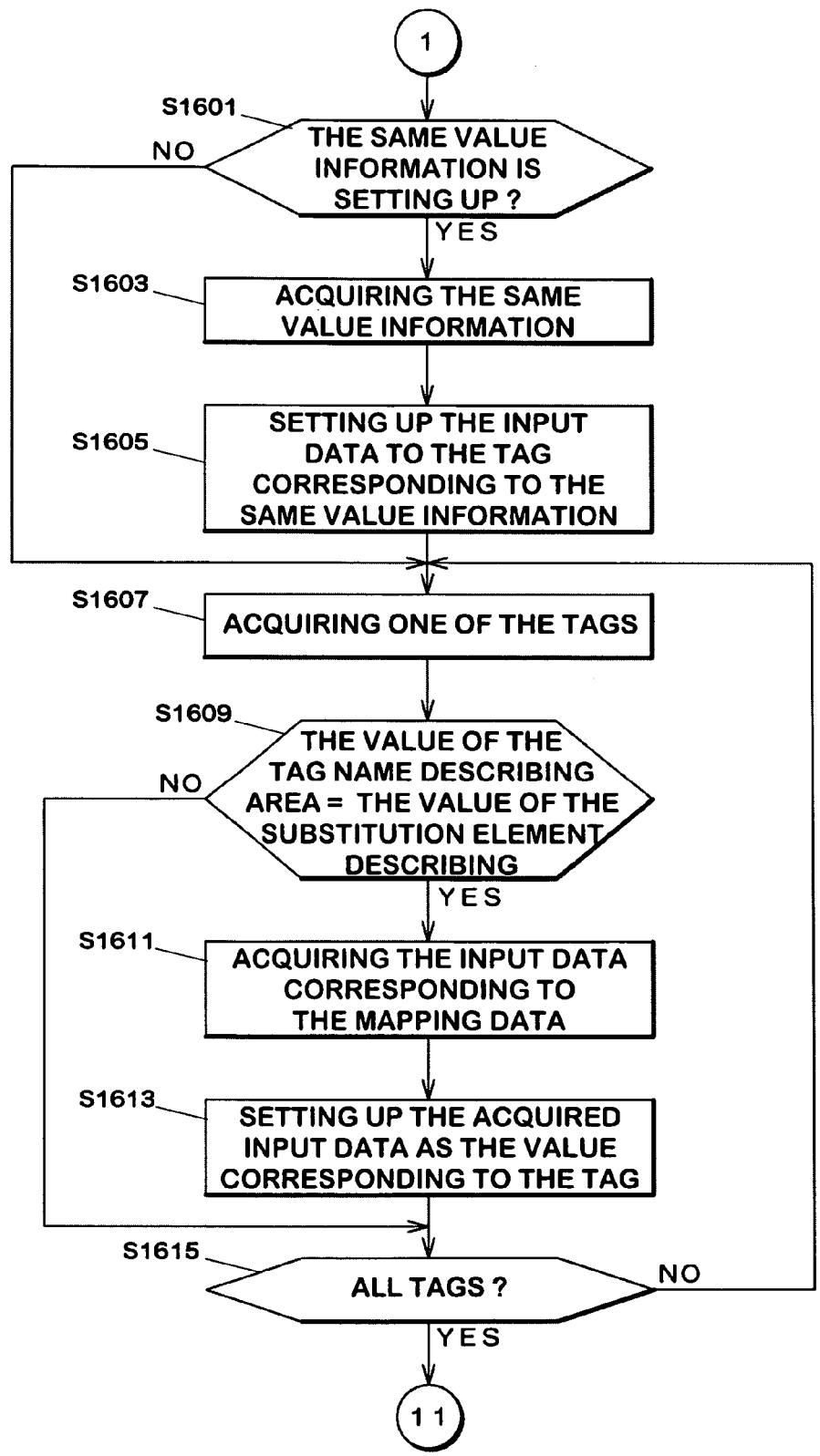
FIG. 17 shows a flow chart for processing the repeat control procedure.

As shown in FIG. 17, the CPU 211 judges whether or not the same value information is set up in the memory 212 (S1601). If the CPU 211 judges that the same value information is set up, the CPU 211 acquires the same value information from the memory 212(S1603). The CPU 211 sets up the input data I3 to the tag corresponding to the same value information in the tags output in the step S809' (S1605).

The CPU 211 acquires one of the repeat tag acquired in the step S805 (see FIG. 16) (S1607). The CPU 211 judges whether or not the mapping data exists whose value of the substitution element describing area is the same as the value of the tag name describing area of the acquired tag (S1609).

When judged that the said mapping data exists, the CPU 211 acquires the input data corresponding to the said mapping data (S1611). The CPU 211 sets up the acquired input data, as the value corresponding to the tag judged as same in the step S1609, in the XML file, where the tag belonging to the same rank or the lower rank than the tag corresponding to the repeat element (S1613).

The CPU 211 processes the procedures from the step S1607 to the step S1613 about all of the tag included in the repeat acquired in the step S805 (S1615).

Figure 18:
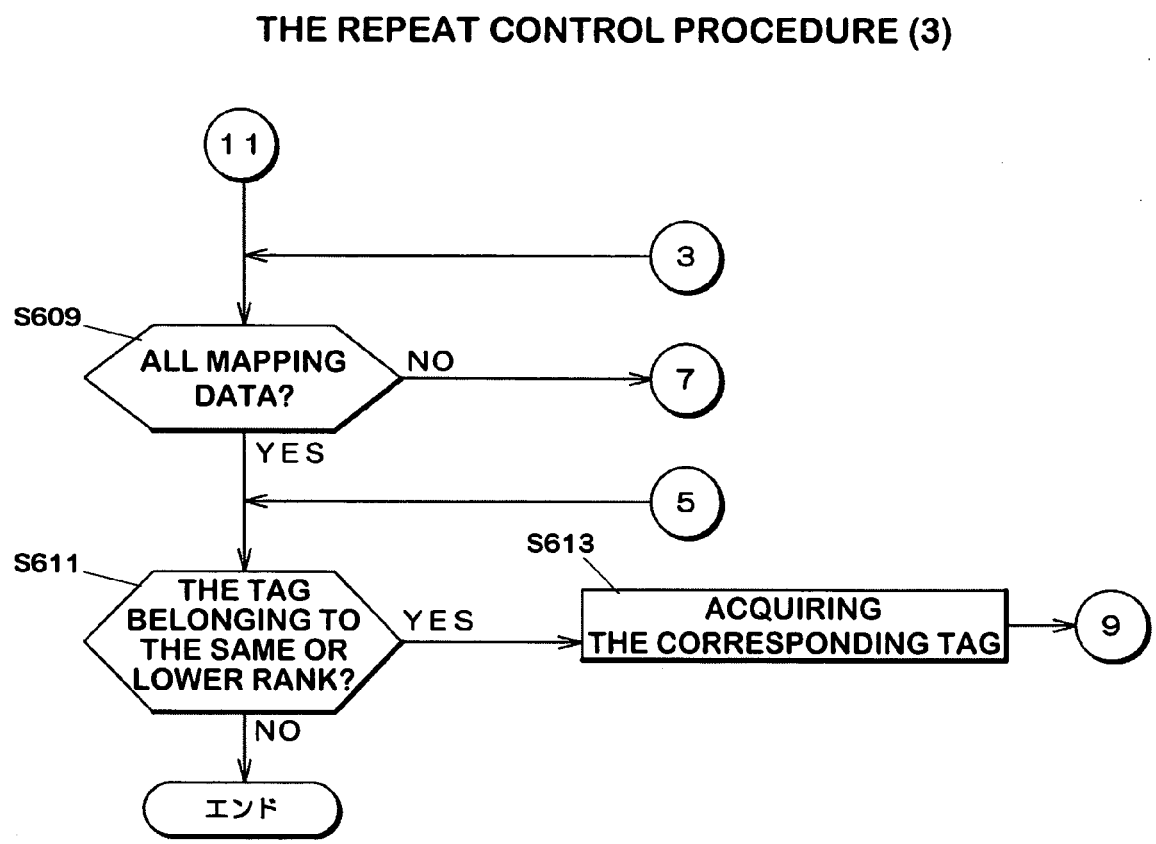
FIG. 18 shows a flow chart for processing the repeat control procedure.

As shown in FIG. 18, when judged that the procedures from the step S1607 to the step S1613 to all of the tags included in the repeat tag acquired in the step S805 are finished, the CPU 211 judges whether or not the same procedures is finished to all of the mapping data (S609).

When judged that the same procedures are NOT finished about all mapping data, the CPU 211 acquires another mapping data (S602: see FIG. 16). The CPU 211 processes the procedures following the step S603.

When judged that the same procedures is finished to all of the mapping data in the step S609 of FIG. 18, the CPU 211 judges whether or not the tag exists in the form data X3 which belongs to the same rank or the lower rank than the tag acquired in the step S601 or S603 (S611). The CPU 211 acquires the tag belongs to the same rank or the lower rank than the tag acquired in the step S601 or S603 (S613). The CPU 211 processes the procedures following the step S602. When judged in the step S611 that if the tag does NOT exist in the form data X3 whish belongs to the same rank or the lower rank than the tag acquires in the step S601 or S603, the CPU 211 finishes the all procedures.

3.2.2 Illustrative Embodiment

The operation of the repeat control procedure is described concretely using the form data X3 (referred to FIG. 12), the mapping data M3 (refer to FIG. 13) and the input data I3 (FIG. 14).

Hereinafter, the CPU 211 acquires the input data I3 "100, 300" included the row 2 of the input data file FI3 (S1403: FIG. 15).

The CPU211 acquires the tag "<T1>" belonging to the top rank from the form data file FX3 (S600). The CPU211 acquires one of the mapping data M3 "A@T1" from the mapping data file FM3 (S602). Because of the difference between the value "T1" of the tag name describing area of the tag "<T1>" and the value "A" of the substitution element describing area of the mapping data "A@T1" (S603), the CPU 211 acquires the mapping data M3 "B@T1" after acquiring the mapping data M3 "A@T1" (S609, S602). Because of the difference between the value "T1" of the tag name describing area of the tag "<T1>" and the value "B" of the substitution element describing area of the mapping data "B@T1" (S603), the CPU 211 acquires the tag "<A>" belonging to the lower rank than the tag "<T>" from the form data file FX3 (S609, S611, S613, S602).

The CPU211 acquires one of the mapping data M3 "A@T1" from the mapping data file FM3 (S602).). Because of the accordance with the value "A" of the tag name describing area of the tag "<A>" and the value "A" of the substitution element describing area of the mapping data "A@T1" (S603), the CPU 211 processes the father element presumption procedure (S605).

After the father element presumption procedure, the CPU 211 judges the tag "<T>" as the repeat element.

When judged that the value "100" of the row 2 included in input data acquired in the step S1403 is the same as the corresponding value "100" of the row 1 (S1501), the CPU 211 sets up the same value information (S1503).

The CPU 211 acquires the mapping data M3 "B@T1" (S609, S602), and judges that the value "A" of the tag name describing area of the tag "<A>" does NOT exist in the substitution element describing area of the mapping data "B@T1" (S603).

The CPU 211 processes the above mentioned procedures for tag "<T2>" which belongs to the same rank as the tag "<A>".

Next, the CPU 211 acquires from the form data file FX3 the tag "<B>" belonging to the next lower rank than the tag "<T2>" (S613). The CPU 211 acquires the mapping data M3 "A@T1" (S609, S602), and judges that the value "B" of the tag name describing area of the tag "<B>" does NOT exist in the substitution element describing area of the mapping data "A@T1" (S603).

And the CPU 211 acquires the mapping data M3 "B@T1" (S609, S602). When judged that the value "B" of the tag name describing area of the tag "<B>" exists in the substitution element describing area of the mapping data "B@T1" (S603), the CPU 211 processes the father element presumption procedure (S605).

After the father element presumption procedure, the CPU 211 judges the tag "<T1>" as the repeat element.

When judged that the value "300" of the row 2 acquired from the input data M3 acquired in the step S1403 is different from the corresponding value "200" of the row 1 (S1501), the CPU 211 acquires the value "<T1>" of the repeat element stored at memory 212 (S803).

The CPU 211 acquires the tags "<T1> <A> </A> <T2> <B> </B> </T2> </T1>" as the repeat tag from the form data file FM3, the tags belong to the repeat rank corresponding to the acquired repeat element "<T1>" (S805). The CPU 211 outputs repeatedly the tags acquired in the step S805 at the same rank as the tag "<T1>" stored as the repeat element (S809). The XML file at this stage is described in FIG. 19B.

The CPU 211 judges whether or not the same value information is set up in the memory 212 (S1601). When judged that the same value information is set up in the memory 212, the CPU 211 acquires the same value information "<A>" set up in memory 212 (S1603). The CPU 211 sets up the input data I3 "100", which is value of the row 2, column 1 of the input data file FI3, as the value of the tag corresponding to the same value information "<A>" among the tags "<T1> <A> </A> <T2> <B> </B> </T2> </T1>" output in the step S809' (S1603). The XML file at this stage is described in FIG. 19C.

The CPU 211 acquires the tag "<T1>" of the repeat tag acquired in the step S805 (S1607). When judged that the mapping data does NOT exist whose value of the substitution element describing area of it is the same as the value of the tag name describing area of the acquired tag (S1609), the CPU 211 acquires the tag belonging to the next lower rank (S1615).

When judged that the mapping data does NOT exist whose value of the substitution element describing area of itself is the same as the value of the tag name describing area of the acquired tag (S1609), the CPU 211 acquires the tag belonging to the next lower rank (S1607, S1609, S1615).

The CPU 211 acquires the tag "<B>" (S1607), when judged that the mapping data does NOT exist whose value of the substitution element describing area of itself is the same as the value of the tag name describing area of the acquired tag (S1609), and acquires the input data I3 "300" corresponding to the mapping data M3 "B@T1" (S1611). The CPU 211 sets up the acquired input data I3 "300" as the value corresponding to the tag "<B>" (S1613). The XML file at this stage is described in FIG. 19D.

Third Embodiment

1. Summary

In the second embodiment, each repeat element describing area of the mapping data has the same value.

In this embodiment, the operations of the hierarchy structure data generating system is described when the repeat element describing area of the mapping data dose NOT have the same value.

Hereinafter, the hardware structure of this embodiment is the same as that in the second embodiment. The operation of the hierarchy structure data generating system is also same as that in the second embodiment. For the same hardware and procedures as the second embodiment, same numbers are given.

2. Data

The form data, the mapping data, and the input data will be described. The form data, the mapping data, are stored in the hard disk drive 213 of the hierarchy structure data generating system of this embodiment. The input data is acquired through the CD-ROM drive 217.

2.1. Form Data

The form data of this embodiment is the same as the form data X3 of the second embodiment (see FIG. 12).

2.2. Mapping Data

Figure 20:
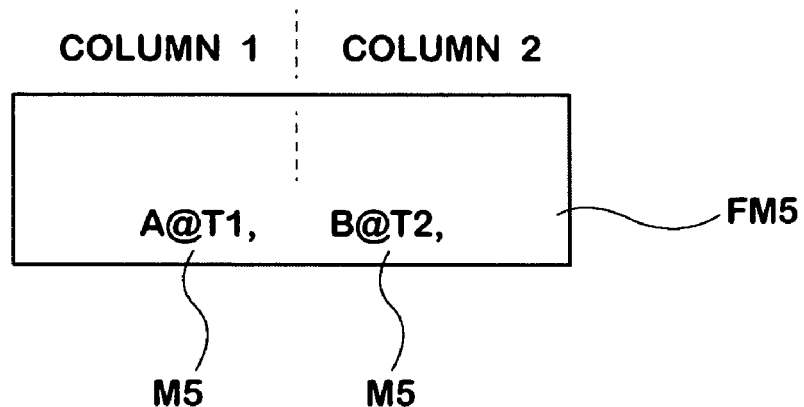
FIG. 20 shows the concrete data structure of the mapping data file FM5 and the mapping data M5.

The mapping data M5 in this embodiment is described in FIG. 20. The mapping data M5 is described in a mapping data file FM5.

In the mapping data file FM5, two columns (column 1, column 2) are set up. In column 1 of the mapping data file FM5, the mapping data M3 "A@T1" is set up. In column 2 of the mapping data file FM3, the mapping data M3 "B@T2" is set up.

The value "T1" is described in the repeat element describing area of the mapping data M5 "A@T1" which is described at column 1 of the mapping data file FM5. The value "T2" is described in the repeat element describing area of the mapping data M5 "B@T2" which is described at column 2 of the mapping data file FM5.

2.3. Input Data

The input data I3 of this embodiment is the same as the form data X3 in the second embodiment (see FIG. 14).

The input data file FI3 of this embodiment is described in FIG. 14B. The input data file FI3 is composed of two lines. In each line, two columns (column 1, column2) are set up.

As well as the second embodiment, the input data describing area of the input data file FI3, identified by a column, corresponds to the mapping data describing area of the mapping data file FM5, identified by its column. The input data I3 "100", identified by row 1, column 1 of the input data file FI3, and the input data I3 "100", identified by row 2, column 1 of the input data file FM3 correspond to the mapping data M5 "A@T1" identified by column 1 of the mapping data file FM5. The input data I3 "200", identified by row 1, column 2 of the input data file FI3, and the input data I3 "300", identified by row 2, column 2 of the input data file FM3 correspond to the mapping data M5 "B@T2" identified by column 2 of the mapping data file FM5.

3. Operation of the Hierarchy Structure Data Generating System 21

The operation of the repeat control procedure is the same as the second embodiment. Hereinafter, the operation of the repeat control procedure is described concretely using the form data X3 (refer to FIG. 12), the mapping data M5 (refer to FIG. 20) and the input data I3 (FIG. 14).

The CPU 211 processes the same procedures with the first embodiment for the input data I3 included in the row 1 of the input data file FI3. The XML file, generated after finishing the procedures for the input data I3 included in the row 1 of the input data file FI3, is described in FIG. 21A.

Hereinafter, the CPU 211 acquires the input data I3 "100, 300" included the row 2 of the input data file FI3 (S1403: FIG. 15).

The CPU211 acquires the tag "<T1> </T>" belonging to the top rank from the form data file FX3 (S601). Next, the CPU211 outputs the acquired tag "<T1> </T>" to the XML file (S601).

The CPU211 acquires one of the mapping data M5 "A@T1" from the mapping data file FM5 (S602). Because of the difference between the value "T1" of the tag name describing area of the tag "<T1>" and the value "A" of the substitution element describing area of the mapping data M5 "A@T1" (S603), the CPU 211 acquires the next mapping data M5 ∂B@T1" after acquiring the mapping data M5 "A@T1" (S609, S602). Because of the difference between the value "T1" of the tag name describing area of the tag "<T1>" and the value "B" of the substitution element describing area of the mapping data M5 "B@T1" (S603), the CPU 211 acquires the tag "<A>" belonging to the lower rank than the tag "<T>" from the form data file FX3 (S609, S611, S613, S602).

The CPU211 acquires one of the mapping data M5 "A@T1" from the mapping data file FM5 (S602). Because of the accordance with the value "A" of the tag name describing area of the tag "<A>" and the value "A" of the substitution element describing area of the mapping data M5 "A@T1" (S603), the CPU 211 processes the father element presumption procedure (S605).

After the father element presumption procedure, the CPU 211 judges the tag "<T>" as the repeat element.

When judged that the value "100" of the row 2 included in input data acquired in the step S1403 is the same as the corresponding value "100" of the row 1 (S1501), the CPU 211 sets up the same value information "<A>" (A1503).

The CPU 211 acquires the mapping data M5 "B@T2" (S609, S602), and judges that the value "A" of the tag name describing area of the tag "<A>" does NOT exist in the substitution element describing area of the mapping data M5 "B@T2" (S603).

With regard to the form data X3, the CPU 211 processes the above mentioned procedures for tag "<T2>" which belongs to the same rank as the tag "<A>" belongs to.

The CPU 211 acquires from the form data file FX 3 the tag "<B>" belonging to the next lower rank than the tag "<T2>" (S613). The CPU 211 acquires the mapping data M5 "A@T1" (S609, S602), and judges that the value "B" of the tag name describing area of the tag "<B>" does NOT exist in the substitution element describing area of the mapping data M5 "A@T1" (S603).

And the CPU 211 acquires the mapping data M5 "B@T2" (S609, S602). When judged that the value "B" of the tag name describing area of the tag "<B>" exists in the substitution element describing area of the mapping data M5 "B@T2" (S603), the CPU 211 processes the father element presumption procedure (S605).

After the father element presumption procedure, the CPU 211 judges the tag "<T2>" as the repeat element.

When judged that the value "300" of the row 2 acquired from the input data I3 acquired in the step S1403 is different from the corresponding value "200" of the row 1 (A1501), the CPU 211 acquires the value "<T2>" of the repeat element stored at memory 212 (S803).

The CPU 211 acquires all tags "<T2><B></B></T2>" as the repeat tag from the form data file FM3, the tags belong to the repeat rank corresponding to the acquired repeat element "<T2>" (S805). The CPU 211 outputs to the XML file repeatedly the repeat tag acquired in the step S805 at the same rank as the tag "<T2>" stored as the repeat element (S809'). The XML file at this stage is described in FIG. 21B.

The CPU 211 judges whether or not the same value information is set up in the memory 212 (S1601). When judged that the same value information is set up in the memory 212, the CPU 211 acquires that same value information "<A>" set up in memory 212 (S1603). The CPU 211 does NOT process the procedure in the step S1603 because the value of the tag corresponding to the same value information "<A>" does NOT exist in the tags "<T2><B></B></T2>" output in the step S809' (S1605).

The CPU 211 acquires the tag "<T2>" from the repeat tag acquired in the step S805 (S1607). When judged that the mapping data M5 does NOT exist whose value "B" of the substitution element describing area of itself is the same as the value "T2" of the tag name describing area of the acquired tag "<T2>" (S1609), the CPU 211 acquires the tag belonging to the next lower rank (S1615).

After the CPU 211 acquired the tag "<B>" (S1607), when judged that the mapping data does NOT exist whose value of the substitution element describing area of itself is the same as the value of the tag name describing area of the acquired tag (S1609), and acquires the input data I3 "300" corresponding to the mapping data M5 "B@T2" (S1611). The CPU 211 sets up the acquired input data I3 "300" corresponding to the value of the tag "<B>" (S1613). The XML file at this stage is described in FIG. 21C.

Forth Embodiment

1. Summary

In the forth embodiment, the operation of the hierarchy structure data generating system is described using tangible data corresponding to the form data X1, the mapping data M1, and the input data I1 of the first embodiment.

Hereinafter, the hardware structure of this embodiment is the same as the first embodiment. The operation of the hierarchy structure data generating system is also same with that of in the first embodiment.

2. Data

The form data X11, the mapping data M11, and the input data I11 are described. The form data X11, the mapping data M11, are stored in the hard disk drive 213 of the hierarchy structure data generating system of this embodiment. The input data I11 is acquired through the CD-ROM drive 217.

2.1 Form Data

The form data X11 in this embodiment is described by FIG. 22. The form data X1 is described with the use of XML. The form data X11 is described in a form data file FX11.

The form data X11 includes one or more tags such as <journalization>, </journalization>, <journal specification>, </journal specification>, <debtor-creditor> </debtor-creditor>, <account>, </account>, <code>, </code>, <name>, </name>, <amount> and </amount>.

Each tag generates hierarchy structure. In the form data X11 the tags belonging to the top rank are <journalization> and </journalization>. The tags belonging to the second rank are <journal specification> and </journal specification>. The tags belonging to the third rank are <debtor-creditor>, </debtor-creditor>, <account>, </account>, <amount> and </amount>. The tags belonging to the last rank are <code>, </code>, <name> and </name>.

2.2 Mapping Data

The mapping data M11 in this embodiment is described in FIG. 23. The mapping data M11 is described in a mapping data file FM11.

In the mapping data file FM11, one row (row 1) and eight columns (column 1-column 8) are set up. In the column 1 of the mapping data file FM11, the mapping data M11 "name (1)@journal specification" is set up. In the column 2, the mapping data M11 "amount(1)" is set up. In the column 3, the mapping data M11 "debtor-creditor(1)" is set up. In the column 4, the mapping data M11 "code(1)@journal specification" is set up. In the column 5, the mapping data M11 "name(2)@journal specification" is set up. In column 6, the mapping data M11 "amount(2)" is set up. In the column 7, the mapping data M11 "debtor-creditor(2)" is set up. In the column 8, the mapping data M11 "code(2)@journal specification" is set up.

The value "journal specification" is described in each repeat element describing area of the mapping data M11 "name(1)@journal specification" corresponding to the column 1 of the mapping data file FM11, the mapping data M11 "code(1)@journal specification" corresponding to the column 4, the mapping data M11 "name(2)@journal specification" corresponding to the column 5, the mapping data M11 "name(2)@journal specification" corresponding to the column 8.

On the other hand, nothing is described in the each repeat element describing area of the mapping data M11 "amount (1)" corresponding to the column 2 of the mapping data file FM11, the mapping data M11 "debtor-creditor(1)" corresponding to the column 3, the mapping data M11 "amount (2)" corresponding to the column 6, the mapping data M11 "debtor-creditor(2)" corresponding to the column 7.

The value "1" is described in the each repeat number describing area of the mapping data M11 "name(1)@journal specification" corresponding to the column 1 of the mapping data file FM11, the mapping data M11 "amount(1)" corresponding to the column 2, the mapping data M11 "debtor-creditor(1)" corresponding to the column 3, the mapping data M11 "code(1)@journal specification" corresponding to the column 4.

The value "2" is described in the each repeat number describing area of the mapping data M11 "name(2)@journal specification" corresponding to the column 5 of the mapping data file FM11, the mapping data M11 "amount(2)" corresponding to the column 6, the mapping data M11 "debtor-creditor(2)" corresponding to the column 7, the mapping data M11 "code(2)@journal specification" corresponding to the column 8.

2.3 Input Data

The input data I11 in this embodiment is described in FIG. 24. The input data I11 is described in an input data file FI11.

In the input data file FI11, one row (row 1) and eight columns (column 1-column 8) are set up. In the column 1 of the input data file FI11, the input data I11 "account receivable" is set up. In the column 2, the input data I11 "10000" is set up. In the column 3, the input data I11 "debtor" is set up. In the column 4, the input data I11 "00001" is set up. In the column 5, the input data I11 "goods account" is set up. In column 6, the input data I11 "10000" is set up. In the column 7, the input data I11 "creditor" is set up. In the column 8, the input data I11 "00100" is set up.

The input data I11 specified by the column of the input data file FI11 corresponds to the mapping data M11 specified by the column of the mapping data file FM11. That is, the input data I11 "account receivable", specified by the column 1 of the input data file FI11, corresponds to the mapping data M11 "name(1)@journal specification", specified by the column 1 of the mapping data file FM11. The same goes for the other input data I11 and the other mapping data M11.

3. Operation of the Hierarchy Structure Data Generating System 21

As mentioned before, the operation of the hierarchy structure data generating system of this embodiment is the same as the first embodiment. The operation of the hierarchy structure data generating system is described concretely using the form data X11, the mapping data M11, and the input data I11.

The CPU211 acquires the tag <journalization> belonging to the top rank from the form data file X11 (S600). Next, the CPU211 outputs the acquired tag <journalization> and the tag </journalization> paired with it to the XML file (S601).

The CPU211 acquires one of the mapping data M11 "name (1)@journal specification" from the mapping data file FM11 stored in the hard disk drive213 (S602). The CPU 211 judges whether the value "journalization" of the tag name describing area at the tag <journalization> acquired in the step S601 is the same as the value "name" of the substitution element describing area of the mapping data M11 "name(1)@journal specification" acquired in the step S602 or not (S603). In this case, the CPU 211 judges that the value "journalization" of the tag name describing area at the tag <journalization> is NOT the same as the value "name" of the substitution element describing area of the mapping data "name(1)@journal specification".

The CPU 211 judges that for the other mapping data M11 "amount(1)" the judgment in the step S603 has NOT been processed (S609). Next, the CPU211 acquires the mapping data M11 "amount(1)" (S602). The CPU 211 judges that the value "journalization" of the tag name describing area at the tag <journalization> is NOT the same as the value "amount" of the substitution element describing area of the mapping data "amount(1)" (S603).

The CPU 211 processes the procedure from the step S601 to the step S603 for the other mapping data M11. And the CPU 211 judges whether or not the procedure in the step S603 has been processed for all mapping data M11 described in the mapping data file FM1.

When judged that the procedures from the step S601 to the step S603 have been processed to all of the mapping data M11 (S609), the CPU 211 judges whether or not the tag exists in the form data X11 which belongs to the same rank or the next lower rank than the tag <journalization>. In this case, the CPU 211 judges that the tag "<journal specification>" exists in the form data X11 which belongs to the same rank or the next lower rank than the tag <journalization> (S611). The CPU 211 acquires the tag <journal specification> (S613). The CPU 211 processes the procedures from the step S601 to the step S603, step S609, for the tag "<journal specification>" with regard to the tag "<journalization>".

Next, the CPU 211 acquires that the tag "<debtor-creditor>" belonging to the next lower rank to the tag "<journal specification>" (S611, S613). The CPU211 acquires the mapping data M11 "name(1)@journal specification" from the mapping data file FM11 (S602). The CPU 211 judges whether or not the value "debtor-creditor" of the tag name describing area at the acquired tag <debtor-creditor> is the same as the value "name" of the substitution element describing area of the mapping data M11 "name(1)@journal specification" acquired in the step S602 (S603). In this case, the CPU 211 judges that the value "debtor-creditor" of the tag name describing area at the tag <debtor-creditor> is NOT the same as the value "name" of the substitution element describing area of the mapping data "name(1)@journal specification".

The CPU 211 judges that for the other mapping data M11 "amount(1)" the judgment in the step S603 has NOT been processed (S609). After that, the CPU211 acquires the mapping data M11 "amount(1)" (S602). The CPU 211 judges that the value "debtor-creditor" of the tag name describing area at the tag <debtor-creditor> is NOT the same as the value "amount" of the substitution element describing area of the mapping data M11 "amount(1)" (S603).

When judged that for the next mapping data M11 "debtor-creditor(1)" the judgment in the step S603 has NOT been processed (S609), the CPU211 acquires the mapping data M11 "debtor-creditor(1)" (S602). The CPU 211 judges that the value "debtor-creditor" of the tag name describing area at the tag <debtor-creditor> is the same as the value of the substitution element describing area of the mapping data "debtor-creditor(1)" (S603).

Then the CPU 211 processes the father element presumption procedure for the mapping data M11 "debtor-creditor (1)" (S605). The CPU 211 judges that the repeat element name is NOT set at the repeat element describing area in the mapping data M11 "debtor-creditor(1)" (S701). And the CPU 211 acquires from the form data X11 the tag corresponding to the substitution element name "debtor-creditor" (S705). The CPU 211 acquires the tag "<debtor-creditor>", and then acquires the tag "<journal specification>" belonging to the next upper rank to the acquired tag "<debtor-creditor>" (S707). The CPU 211 sets the acquired tag "<journal specification>" for a repeat element (S709).

Next, the CPU 211 processes the repeat element applying procedure (S607). The CPU 211 judges whether or not the value is set in the repeat number describing area of the mapping data M11 "debtor-creditor(1)" (S800). When judged the value is set in the repeat number describing area, the CPU 211 acquires the value "1" of the repeat number describing area of the mapping data M11 "debtor-creditor(1)" (S801). The CPU 211 acquires the value of the repeat element "<journal specification>" corresponding to the mapping data M11 "debtor-creditor(1)" from the memory 212 (S803). The CPU 211 acquires the tags "<journal specification> <debtor-creditor> </debtor-creditor> <account> <code> </code> <name> </name> </account> <amount> </amount> </journal specification>" as the repeat tag from the form data file FX11, the tags belong to the same rank as the tag corresponding to the acquired repeat element (a repeat rank) and the lower rank than the tag "<journal specification>" corresponding to the acquired repeat element (S805).

The CPU 211 judges whether or not the repeat tag "<journal specification> <debtor-creditor> </debtor-creditor> <account> <code> </code> <name> </name> </account> <amount> </amount> </journal specification>", acquired in the step S805, is output to the XML file "1" time repeatedly (S807), the value "1" is the value of the repeat number describing area acquired in the step S801. Nothing is described in the XML file before finishing these steps, because the mapping data M11 "debtor-creditor(1)" is the first mapping data the CPU 211 acquired in the step S602 (FIG. 6).

When judged that the repeat tag "<journal specification> <debtor-creditor> </debtor-creditor> <account> <code> </code> <name> </name> </account> <amount> </amount> </journal specification>", acquired in the step S805, are NOT output to the XML file "1" time repeatedly, the CPU 211 outputs the tags acquired in the step S805 in the same rank as the rank which the tag stored as the repeat element. On putting out the acquired tags "<journal specification> <debtor-creditor> </debtor-creditor> <account> <code> </code> <name> </name> </account> <amount> </amount> </journal specification>", the CPU 211 outputs the value of the repeat number describing area times repeatedly (S809). After finishing the step S809, the XML file is described at FIG. 25A.

The CPU 211 acquires the tag "<journal specification>" which belongs to the highest rank among the repeat tag "<journal specification> <debtor-creditor> </debtor-creditor> <account> <code> </code> <name> </name> </account> <amount> </amount> </journal specification>", acquired in the step S805 (S811). The CPU 211 judges whether or not the value "journal specification" of the acquired tag "<journal specification>" has the same value as the value of the substitution element describing area at the mapping data "debtor-creditor(1)" as an object of this procedure (S813).

When judged in the step S813 that the value "journal specification" of the tag name describing area at the acquired tag "<journal specification>" is NOT the same value as the substitution element describing area at the mapping data "debtor-creditor(1)" as an object of this procedure, the CPU 211 judges whether or not the tag exists in the form data X1 which belongs to the lower rank than the tag "<journal specification>" acquired in the step S811 (S819). When judged that the tag "<debtor-creditor>" belonging to the lower rank exists in the form data X1, the CPU 211 acquires the tag "<debtor-creditor>" (S821). When judged that the acquired tag "<debtor-creditor>" has the same value with the substitution element describing area at the mapping data "debtor-creditor(1)" as an object of this procedure, the CPU 211 acquires from the input data file FI11 the input data "creditor" corresponding to the mapping data "debtor-creditor(1)" (S815). The CPU 211 sets the acquired input data "creditor" as the value corresponding to the tag "<debtor-creditor>" judged the same in the step S813 to the XML file generated in the step S809 (S817). The XML file generated so far is shown FIG. 25B.

Next, the CPU 211 acquires that the tag "<account>" belonging to the same rank with the tag "<debtor-creditor>" (S611, S613). For the tag "<debtor-creditor>" the CPU 211 processes the procedures from the step S602 to the step S609.

Next, the CPU 211 acquires that the tag "<amount>" belonging to the same rank with the tag "<account>" (S611, S613). For the tag "<amount>" the CPU 211 processes the procedures from the step S602 to the step S609 with the mapping data M11 "name(1)@journal specification".

The CPU 211 acquires the next mapping data M11 "amount(1)" (S609, S602), and judges that the value "amount" of the tag name describing area of the tag "<amount>" is the same value with the substitution element describing area of the mapping data M11 "amount(1)" acquires in the step (S603).

The CPU 211 processes the father element presumption procedure of the mapping data M11 "amount (1)" (S605). After finishing the father element presumption procedure, the CPU 211 sets up the tag "<journal specification>" for the repeat element (S709).

Next, the CPU 211 processes the repeat element applying procedure (S607). The CPU 211 judges whether or not the value is set in the repeat number describing area of the mapping data M11 "amount(1)" (S800). When judged the value is set in the repeat number describing area, the CPU 211 acquires the value "1" of the repeat number describing area of the mapping data M11 "amount(1)" (S801). The CPU 211 acquires the repeat element "<journal specification>" corresponding to the mapping data M11 "amount(1)" from the memory 212 (S803). The CPU 211 acquires the tags "<journal secification> <debtor-creditor> </debtor-creditor> <account> <code> </code> <name> </name> </account> <amount> </amount> </journal specification>" as the repeat tag from the form data file FX11, the tags belong to the same rank as the tag corresponding to the acquired repeat element "<journal specification>" (a repeat rank) and the lower rank than the tag "<journal specification>" corresponding to the acquired repeat element (S805).

The CPU 211 judges whether or not the repeat tag "<journal secification> <debtor-creditor> </debtor-creditor> <account> <code> </code> <name> </name> </account> <amount> </amount> </journal specification>", acquired in the step S805, is output to the XML file "1" times repeatedly (S807), the value "1" is the value of the repeat number describing area acquired step in the step S801.

When judged that the repeat tag "<journal specification> <debtor-creditor> </debtor-creditor> <account> <code> </code> <name> </name> </account> <amount> </amount> </journal specification>", acquired in the step S805, is output to the XML file "1" times repeatedly (see FIG. 25A), the CPU 211 acquires the tag "<journal specification>" which belongs to the highest rank in the repeat tag "<journal specification> <debtor-creditor> </debtor-creditor> <account> <code> </code> <name> </name> </account> <amount> </amount> </journal specification>", acquired in the step S805 (S811). The CPU 211 judges whether or not the value "journal specification" of the acquired tag "<journal specification>" has the same value as the value of the substitution element describing area at the mapping data "amount(1)" as an object of this procedure (S813).

When judged in the step S813 that the value "journal specification" of the tag name describing area at the acquired tag "<journal specification>" is NOT the same value with the substitution element describing area at the mapping data "amount(1)" as an object of this procedure, the CPU 211 judges whether or not the tag exists in the form data X11 which belongs to the lower rank than the tag "<journal specification>" acquired in the step S811 (S819). Because of the existence of the tag "<debtor-creditor>" belonging to the lower rank, the CPU 211 acquires the tag "<debtor-creditor>" (S821). The CPU 211 processes the procedures from the step S813 to the step S817 to the acquires tag "<debtor-creditor>".

Next, when judged that the tag "<amount>" belonging to the same rank exists in the form data X11, the CPU 211 acquires the tag "<amount>" (S821). When judged that the acquired tag "<amount>" has the same value with the substitution element describing area at the mapping data "amount (1)" as an object of this procedure, the CPU 211 acquires from the input data file FI11 the input data "10000" corresponding to the mapping data "amount(1)" (S815). The CPU 211 sets the acquired input data "10000" as the value corresponding to the tag "<amount>" judged the same in the step S813 to the XML file generated in the step S809 (S817). The XML file generated so far is shown FIG. 25C.

The CPU 211 processes the procedures from the step S813 to the step S817 for the other tag included in the repeat tag acquired in the step S805 (S819, S821).

The CPU 211 processes the same procedures for the other mapping data M11. The XML file generated after finishing the all procedures is described in FIG. 25D Fifth Embodiment 1. Summary In the third embodiment, the case that each value of the repeat element describing area of the mapping data is the same is described. In this embodiment, the hierarchy structure data generating system 21 can generate the XML file easily by sorting the mapping data by the value of the repeat element describing area.

Hereinafter, in this embodiment, the hardware structure is the same as the third embodiment. The same hardware and procedures as the second embodiment are given the same number.

The function diagram of the hierarchy structure data generating system of this embodiment is described in FIG. 26. The hierarchy structure data generating system21

A hierarchy structure data generating system of the invention will be described in reference to FIG. 27 which shows a basic hierarchy structure data acquiring means m11, a basic hierarchy structure data storage means m12, a mapping data acquiring means m13, a mapping data storage means m14, a item acquiring means m15, a item judging means m17, a repeat rank judging means m19, a repeat item acquiring means m21, a hierarchy structure data generating means m23, a input data acquiring means m25, a input data setting means m27, a repeat number designation part acquiring means m31, a repeat designation part judging means m33, a input data judging means m41, a group judging means m51, and a group input data judging means m53.

The group judging means m51 judges the item whose value described in the repeat designation part of the mapping data is the same to belong to the same group about the item described in the item designation part of the mapping data.

The group input data judging means m53 judges whether the value of the certain row is the same as the value of the front row about all of the input data corresponding to the mapping data which having the item belonging to the same group in the item designation part, and the hierarchy structure data generating system does NOT further process the procedures of the hierarchy structure data generating means and the input data setting means about the item designated in the item designation part of the mapping data corresponding to the first input data when judged the value of the certain row is the same as the value of the front row 2. Data The form data X15, the mapping data M15, stored in the hard disk drive 213 of the hierarchy structure data generating system of this embodiment, and the input data I15, acquired through the CD-ROM drive 217, will be described.

2.1. Form Data

The form data X15 of this embodiment is described in FIG. 27. The form data X15 is described using XML. The form data X15 includes the plural tags <sales> </sales>, <date of shipment> </date of shipment>, <delivery company> </delivery company>, <company code> </company code>, <company name> </company name>, <specification> </specification>, <goods> </goods>, <goods code> </goods code>, <goods name> </goods name>, <quantity> </quantity>, <unit price> </unit price>, <date of an order> </date of an order>.

Each tag generates hierarchy structure. In the form data X15 the tag belonging to the top rank are <sales> and </sales>. The tags belonging to the next lower rank are <date of shipment>, </date of shipment>, <specification> and </specification>. The tags belonging to the next lower rank under the tag <delivery company> are <company code>, </company code>, <company name> and </company name>. The tags belonging to the next lower rank under the tag <specification> are <goods>, </goods>, <quantity>, </quantity>, <unit price>, </unit price>, <date of an order> and </date of an order>. The tag belonging to the next lower rank under the tag <goods> are <goods code>, </goods code>, <goods name> and </goods name>.

2.2. Mapping Data

The mapping data M15 in this embodiment is described in FIG. 28. The mapping data M15 is described in a mapping data file FM15.

In the mapping data file FM15, eight columns (column 1-column 8) are set up. In the column 1 of the mapping data file FM15, the mapping data M15 "goods name@specification" is set up. In the column 2, the mapping data M15 "quantity" is set up. In the column 3, the mapping data M15 "unit price" is set up. In the column 4, the mapping data M15 "goods code@specification" is set up. In the column 5, the mapping data M15 "date of an order" is set up. In column 6, the mapping data M15 "company name@sales" is set up. In the column 7, the mapping data M15 "company code@sales" is set up. In the column 8, the mapping data M15 "date of shipment" is set up.

The value "specification" is described at the each repeat element describing area of the mapping data M15 "goods name@specification" corresponding to the column 1 of the mapping data file FM15, the mapping data M15 "goods code@specification" corresponding to the column 4. The value "sales" is described at the each repeat element describing area of the mapping data M15 "company name@sales"

corresponding to the column 6 of the mapping data file FM15, the mapping data M15 "goods code@specification" corresponding to the column 8.

Nothing is described at the each repeat element describing area of the mapping data M15 "quantity" corresponding to the column 2 of the mapping data file FM15, the mapping data M15 "unit price" corresponding to the column 3, the mapping data M15 "date of an order" corresponding to the column 5, the mapping data M15 "date of shipment" corresponding to the column 7.

2.3. Input Data

The input data I15 in this embodiment is described in FIG. 29. The input data I15 is described in an input data file FI15.

The input data file FI15 includes the two row, and each row includes the eight columns (column 1-column 8) are set up. In the column 1 of the input data file FI15, the value corresponding to "goods name" is set up. In the column 2, the value corresponding to "quantity" is set up. In the column 3, the value corresponding to "unit price" is set up. In the column 4, the value corresponding to "goods code" is set up. In the column 5, the value corresponding to "date of order" is set up. In column 6, the value corresponding to "delivery company" is set up. In the column 7, the value corresponding to "company code" is set up. In the column 8, the value corresponding to "date of shipment" is set up.

The input data values which are set in the each column of the input data file FI15 corresponds to the mapping data M15 identified by the column of the mapping data file FM15. For instance, the input data values which are set in the column 1 of the input data file FI15 corresponds to the mapping data M15 "goods name@specification" of the column 1 of the mapping data file FM15. The same goes for the other column of the input data I15 and the mapping data M15.

3. Operation of the Hierarchy Structure Data Generating System 21

1.1. Basic Procedure

The operation of the hierarchy structure data generating system 21 will be described using the flowchart shown in FIG. 30. The operations of the CPU211 are the same as the second embodiment basically (see FIG. 15). The CPU 211, however, processes the group procedure (S3001) before the procedure of acquiring the values corresponding to the first row from the input data file FM15 (S1401). In addition, the CPU 211 processes the second repeat control procedure (S1405') in place of the repeat procedure of the second embodiment. The difference from the second embodiment, that is the group procedure and the second repeat control procedure, is described in the following.

3.2. Group Procedure

Figure 31:
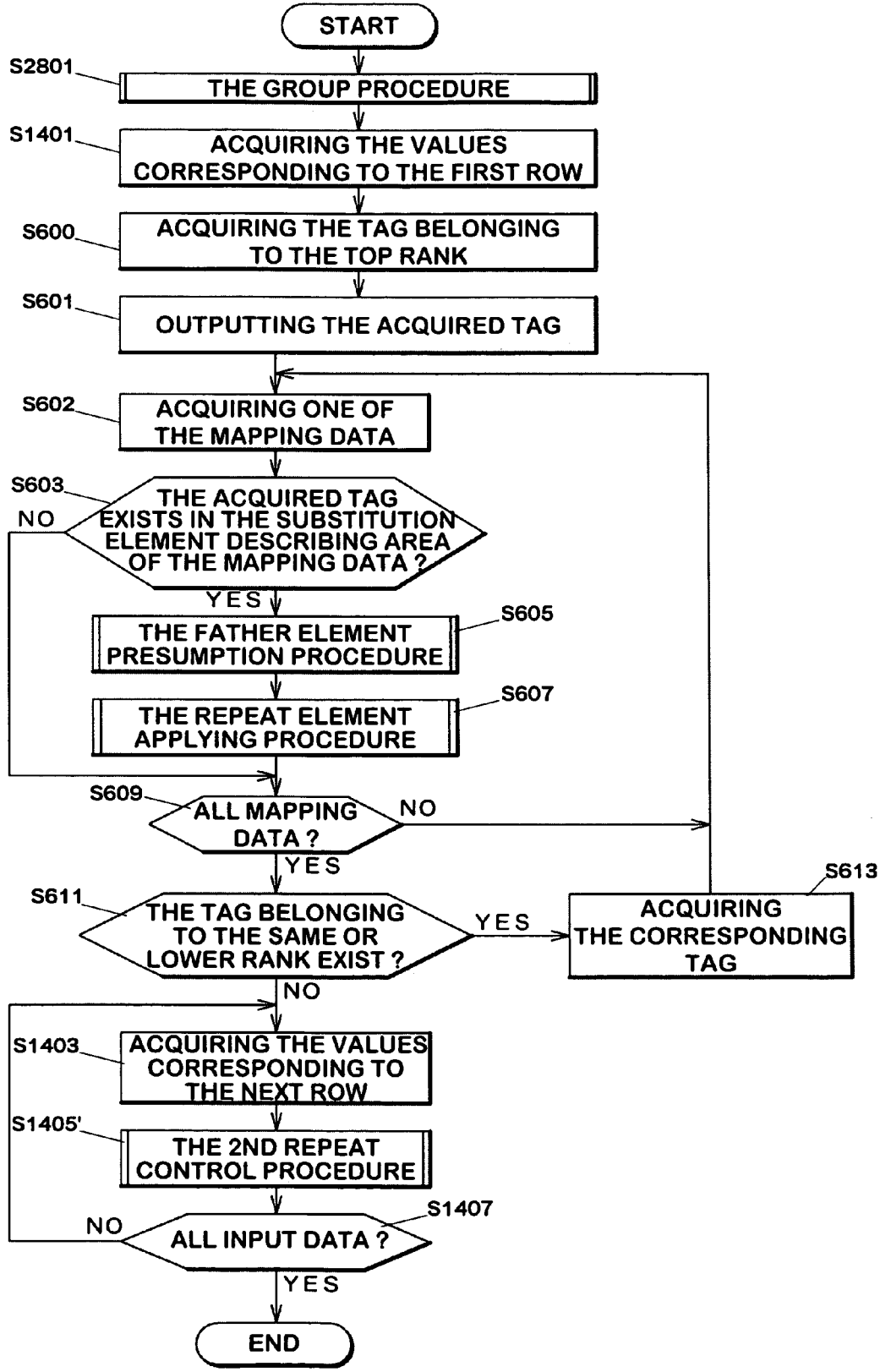
FIG. 31 shows a flow chart of the operation of the hierarchy structure data generating system 21 in the fifth embodiment.

The group procedure which the CPU 211 processes is described in FIG. 31. The CPU211 acquires the one of the mapping data M15 from the mapping data file FM15 (S3101). The CPU 211 processes the father element presumption procedure for the acquired mapping data M15 (S605). The father element presumption procedure processed in this embodiment is the same as that in the first embodiment (see FIG. 7).

The CPU 211 describes the presumed father element as the repeat element in the group table with relating to the tag acquired in the step S703 or S707 (see FIG. 7) (S3103).

Figure 32:
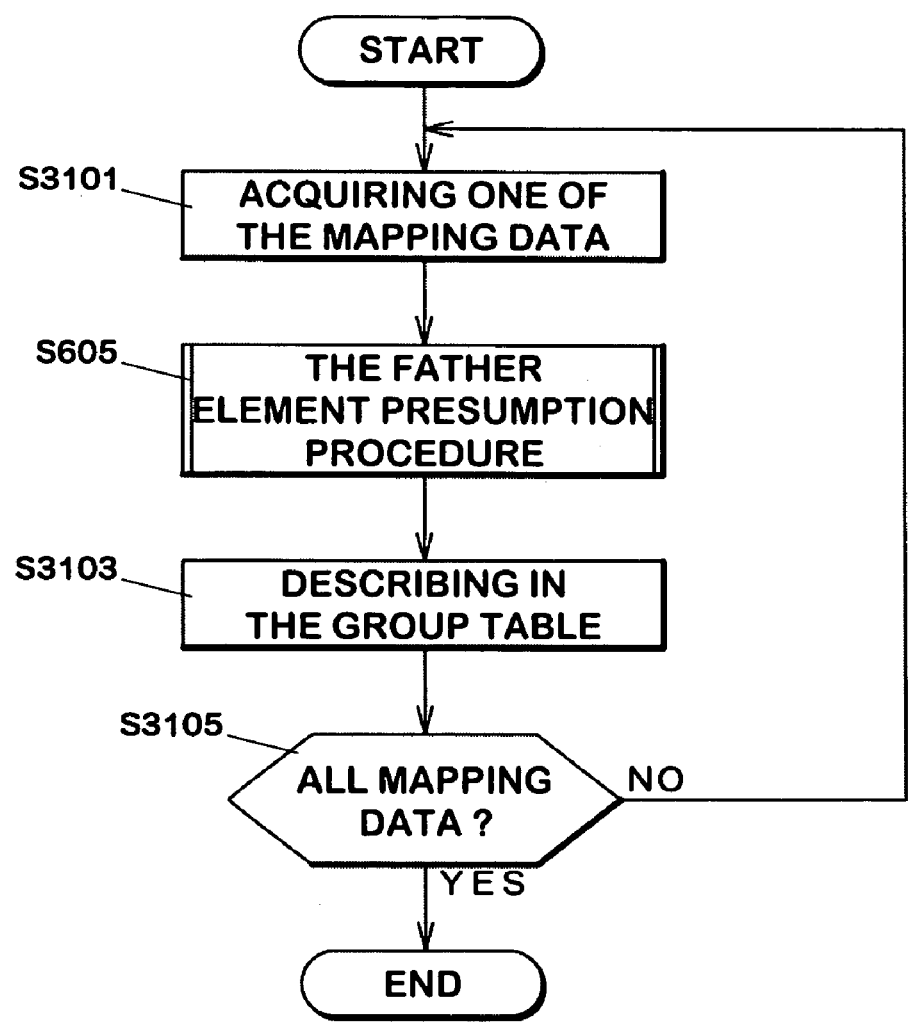
FIG. 32 shows a flow chart for processing the group procedure.

The group table is described in FIG. 32. The group table is the table where the tag included in the form data X15 is related to the repeat element of itself.

The group table includes a tag describing area, a repeat element describing area, a current row's value describing area, and a front row's value describing area. In the tag describing area, the tag included in the form data X15 is described. In the repeat element describing area, the repeat element corresponding to the tag described in the tag describing area is described. In the current row's value describing area, the value of the input data I15 which corresponds to the tag described in the tag describing area and which is included in the row targeted at the current procedures is described. In the front row's value describing area, the value of the input data I15 which corresponds to the tag described in the tag describing area and which is included in the row targeted at the last procedures is described.

The CPU 211 repeats these procedures to all mapping data M15 and generates the group table (S3105).

3.2.1. Illustrative Embodiment

The group procedure is described concretely using the form data X15 (see FIG. 27), the mapping data M15 (see FIG. 28), and the input data I15 (see FIG. 29).

The CPU211 acquires one of the mapping data M15 "goods name@specification" from the mapping data file FM15 (S3101). The CPU 211 processes the father element presumption procedure for the acquired mapping data M15 "goods name@specification" (S605). The CPU 211 judges the repeat element is "specification" for the mapping data M15 "goods name@specification".

Then, the CPU 211 describes the repeat element with relating to the tag acquired in the step S703 or S707 (see FIG. 7) (S3103).

The CPU 211 processes the same procedures for the other mapping data to generate the group table. The CPU 211 sets "0" as the value of the current row's value describing area and the front row's value describing area of the group table when the group table is generated first.

3.3. Second Repeat Control Procedure

The second repeat control procedure which the CPU 211 processes is described in FIG. 32. The CPU 211 updates the value of the current row's value describing area of the group table with the value of the row targeted at the current procedures (S3201). Specifically the CPU 211 clears the value of the front row's value describing area, and updates the value of the front row's value describing area with the value of the current row's value describing area. Then the CPU 211 acquires the value of the row targeted at the current procedures and describes the acquired row's value in the group table with relating to the tag described in the tag describing area of the group table.

After that, the CPU211 acquires the tag belonging to the top rank from the form data file FX15, stored in the hard disk drive 213 (S600). The CPU 211 judges whether or not the acquired tag is described in the tag describing area of the group table (S3203).

When judged that the acquires tag is described in the tag describing area of the group table, the CPU 211 groups together the tags having the same value as the repeat element describing area of the acquired tag, and then judges whether or not about the grouped tags the value of the current row's value describing area is different from the value of the front row's value describing area (S3205). When judged that about the targeted tags the value of the current row's value describing area is different from the value of the front row's value describing area, the CPU 211 processes the step S803 and following.

When judged that the acquired tag is NOT described in the tag describing area of the group table in the step S3203, the CPU 211 acquires the another tag (see FIG. 18: S611, S613).

When judged about the grouped tags the value of the current row's value describing area is NOT different from the value of the front row's value describing area in the step S3205, the CPU 211 sets up the same value information (S1503).

And, the procedures following the step S809' and S1503 in this embodiment is the same as the second embodiment (see FIG. 17, FIG. 18).

3.3.1. Illustrative Embodiment

The second repeat control procedure is described concretely using the form data X15 (see FIG. 27), the mapping data M15 (see FIG. 28), and the input data I15 (see FIG. 29).

Figure 34:
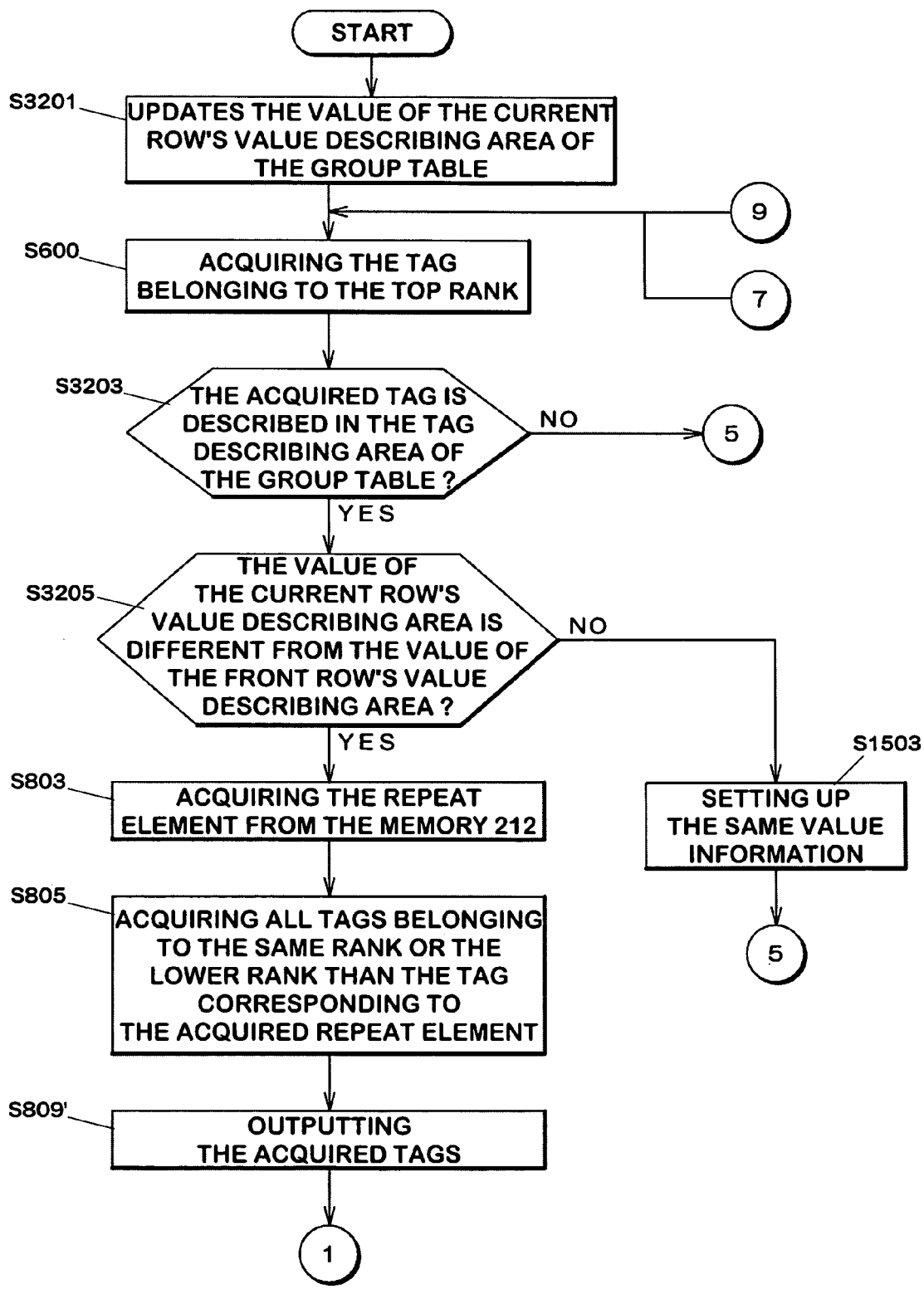
FIG. 34 shows a flow chart for processing the second repeat control procedure.
Figure 36:
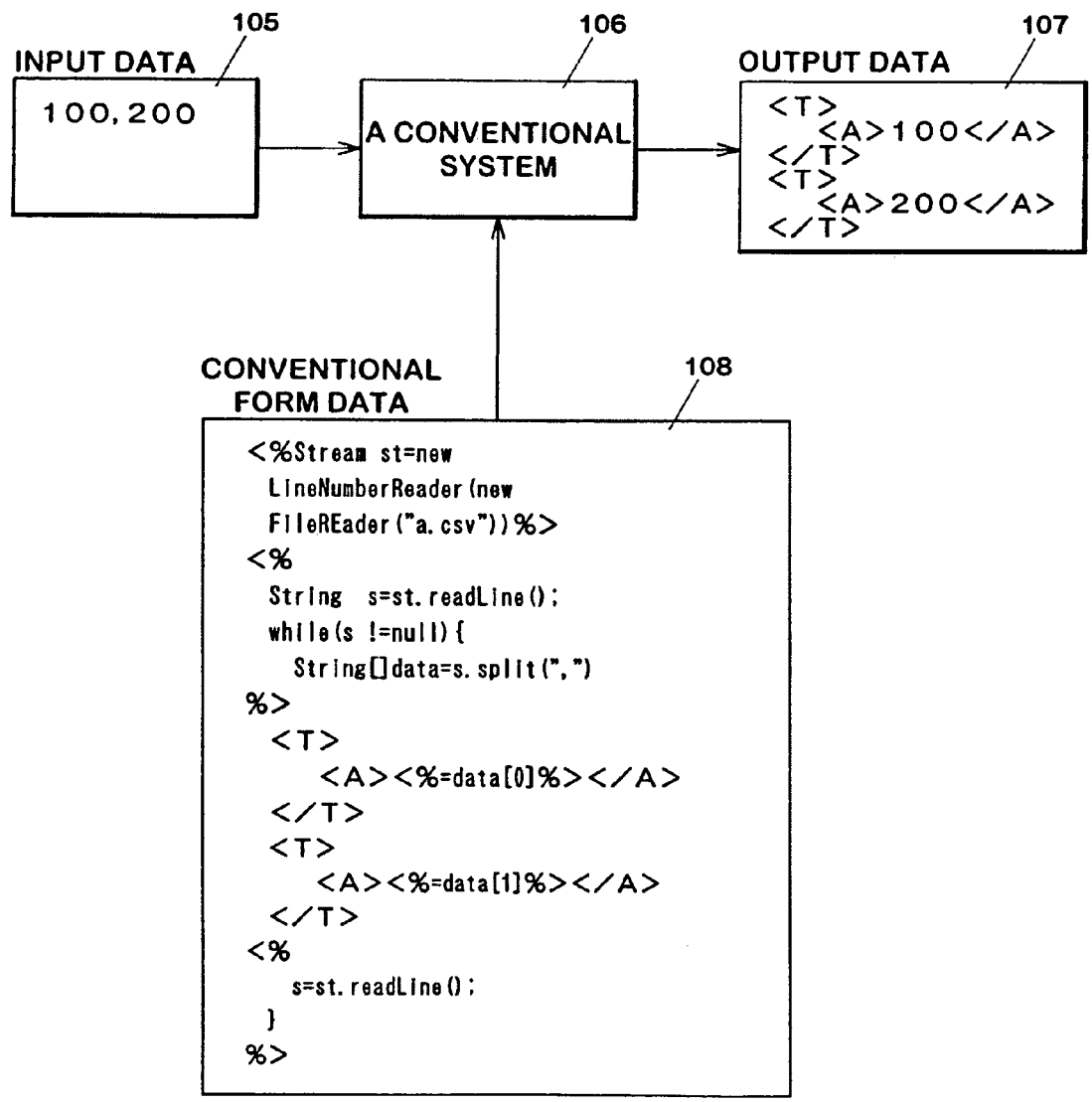
FIG. 36 shows conventional mapping method.

The CPU 211 already finishes the procedures which target at the input data I15 included in the first row of the input data file FX15 before processing the second repeat control procedure. The XML file is described in FIG. 34A and the group table is described in FIG. 32B after finishing the procedures concerning with the input data I15 included in the first row.

The CPU 211 acquires the input data I15 included in the next row from the input data file FI15 (see FIG. 30: S1403), and then updates the value of the current row's value describing area of the group table with the value of the corresponding input data acquired in the step S1403 (S3201).

Specifically the CPU 211 clears the value of the front row's value describing area, and updates the value of the front row's value describing area with the value "2005/04/26, 000102, A company, 000200, PC-A, 1, 150000, 2005/04/24" of the current row's value describing area. Then the CPU 211 acquires the value "PC-B, 1, 120000, 000300, 2005/04/25, A company, 000102, 2005/04/26" of the row targeted at the current procedures and describes the acquired row's value in the group table with relating to the tag "<goods name>, <quantity>, <unit price>, <goods code>, <date of an order>, <company name>, <company code>, <date of shipment>" described in the tag describing area of the group table. The group table after finishing these procedures is described in FIG. 32C.

After that, the CPU211 acquires the tag "<sales>" belonging to the top rank from the form data file FX15 (S601). The CPU 211 judges whether or not the acquired tag <sales> is described in the tag describing area of the group table (S3203).

When judged that the acquired tag <sales> is NOT described in the tag describing area of the group table, the CPU 211 acquires the next tag "<date of shipment>".

When judged that the acquired tag <date of shipment> is described in the tag describing area of the group table, the CPU 211 groups together the tags "<date of shipment>, <company name>, <company code>" having the same value "<sales>" as the repeat element describing area of the acquired tag <date of shipment>, and then judges whether or not about the grouped tags the value "2005/04/26, A company, 000102" of the current row's value describing area is different from the value "2005/04/26, A company, 000102" of the front row's value describing area (S3205). When judged that about the targeted tags the value of the current row's value describing area is NOT different from the value of the front row's value describing area, the CPU 211 sets up the same value information concerning with the tag <date of shipment> (S1503).

Next, the CPU 211 acquires the tag "<delivery company>" (see FIG. 18: S611, S613). When judged that the acquired tag <delivery company> is NOT described in the tag describing area of the group table (S3203), the CPU 211 acquires the next tag "<company code>" (see FIG. 18: S611, S613). Concerning with the tag <company code>, the CPU 211 sets up the same value information (S3203, S3205, S1503). The next tag "<company name>" is similar to the tag <company code>.

The CPU 211 judges that the tag <specification> and <goods> is NOT described in the tag describing area of the group table (S3203).

Then the CPU 211 acquires the next tag "<goods code>". When judged that the acquires tag <goods code> is described in the tag describing area of the group table, the CPU 211 groups together the tags "<goods code>, <goods name>, <quantity>, <unit price>, <date of an order>" having the same value "<specification>" as the repeat element describing area of the acquired tag <goods code>, and then judges whether or not about the grouped tags the value "000300, PC-B, 1, 120000, 2005/04/25" of the current row's value describing area is different from the value "000200, PC-A, 1, 150000, 2005/04/25" of the front row's value describing area for the group (S3205). When judged that about the targeted tags the value of the current row's value describing area is different from the value of the front row's value describing area the CPU 211 processes the step S803 and following.

The CPU 211 finishes the procedures for the tag "<goods code>", and then processes the similar procedures for the other tags. The XML file, generated after finishing the second repeat control procedure concerning with the input data I15 included in the first row of the input data file FI15, is described in FIG. 34B.

Other Embodiments (1) The XML File

While the first embodiment to fifth embodiment are arranged that the XML file is used as the hierarchy structure information, any information which has the hierarchy structure, such as HTML file, may be used.

(2) The Form Data, the Mapping Data, the Input Data

While the first embodiment to fifth embodiment are arranged that the form data file FX1, FX3, . . . where the form data X1, X3, . . . is described, the mapping data file FM1, FM3, . . . where the mapping data M1, M3, . . . is described, and the input data file FI1, FI3, . . . where the input data I1, I3, . . . is described, each file is stored in the hard disk drive 213, the embodiment is not limited by the assumption as long as each file can be acquired, such as acquired by analogue line network, wireless communication network, or the like.

While the first embodiment to fifth embodiment are arranged that the repeat number describing area of the mapping data is discriminated from the other area by using the sign "( )" and the repeat element describing area is discriminated by using the sign "@", the embodiment is not limited by the assumption as long as the repeat number describing area is discriminated by the other area, such as using the sign "*", "/", or the like.

(3) The Case that the Repeat Number Describing Area does NOT Exist

While the first embodiment to fifth embodiment are arranged that when the value is NOT set up in the repeat number describing area, the value "1" is set up as the value of the repeat number describing area, it may be arranged for example that the hierarchy structure data generating system demand the value of the repeat number describing area to its user.

(4) The Case that the Repeat Element Describing Area does NOT Exist

While the first embodiment to fifth embodiment are arranged that when the value is NOT set up in the repeat element describing area, the tag belonging to the next upper rank than the tag described in the substituting element describing area corresponding to the repeat element describing area is set up as the repeat element, it may be arranged for example that the hierarchy structure data generating system demand to its user which tag is set up as the repeat element.

(5) The Correspondence Between the Mapping Data and the Input Data

While the first embodiment to fifth embodiment are arranged that the input data is matched with the mapping data according to the potion of the input data in the input data file which is specified by the row and column and the potion of the mapping data in the mapping data file which is specified by the row and column. The embodiment, however, is not limited by the assumption as long as the input data is matched with the mapping data. For instance, it is by using the file to match the input data with the mapping data that the input data can be matched with the mapping data.

(6) The Group Table

While the fifth embodiment are arranged that with using the group table, the tags described in the substituting element describing area of each mapping data are sorted by the tag described in the repeat element describing area of that mapping data, it may be arranged that without using the group table as long as the tags described in the substituting element describing area of each mapping data can be sorted.

(7) The Procedures Order

While the first embodiment to fifth embodiment are arranged that the procedures of the hierarchy structure data generating system is described in each flowchart, the embodiment is not limited by the assumption as long as the function in the functional diagram of the each embodiment can perform. The embodiment is not limited especially by the order of the procedures described in the each flowchart.

(8) When the Value is NOT Set in the Repeat Element Describing Area

While the first embodiment to fifth embodiment are arranged that the next upper rank than the tag described in the substituting element describing area is set preliminary as the predetermined rank which is used when the value is NOT set up in the repeat element describing area, the embodiment is not limited by the assumption. For instance, the most used rank, the top rank, or the like can be used as the predetermined rank.

According to the invention, a basic hierarchy structure data acquiring means acquires a basic hierarchy structure data to designate a hierarchy structure generated by one or plural items, a mapping data acquiring means acquires a mapping data comprising an item designation part and a repeat designation part, the item designation part designates which input data relates to which item, the repeat designation part that designates in which rank of the hierarchy structure the item designated in the item designation part is output repeatedly, an item acquiring means acquires the item from the basic hierarchy data, an item judging means judges whether the item designated in the item designation part of the mapping data corresponds to the item acquires from the basic hierarchy structure data, a repeat rank judging means judges the rank designated in the repeat designation part of the mapping data as the repeat rank if the item designated in the item designation part of the mapping data corresponds to the item acquires from the basic hierarchy structure data, a repeat item acquiring means acquires the item corresponding to the repeat rank as the repeat item from the basic hierarchy structure data, and a hierarchy structure data generating means generates the hierarchy structure data according to the acquired repeat item.

Thus, there is no need to describe the control statement to output a part of the form data when there is need to input plural items repeatedly. Therefore, this enables to generate the hierarchy structure data including a repeat part easily.

Moreover, the form data and the control statement described by programming language are NOT described mixed.

According to the invention, a basic hierarchy structure data storage means stores the basic hierarchy structure data. This enables to acquire the basic hierarchy structure data easily.

According to the invention, a mapping data storage means stores the mapping data. This enables to acquire the mapping data easily.

According to the invention, a repeat number designation part designates how many times the item corresponding to the item designation part is output repeatedly, a repeat number designation part acquiring means acquires the repeat number designation part, and the hierarchy structure data generating means further generates the hierarchy structure data where the repeat item is output repeatedly the same number of times as the number of value in the repeat number designation part.

This enables easily to output the item designated in the item designation part at the rank designated in the repeat designation part easily According to the invention, the repeat number acquiring means further sets "1" as the value of the repeat number designation part when judged the value dose NOT set up in the repeat number designation part.

Therefore, this enables to save the effort of designating the repeat number in the mapping data.

According to the invention, a repeat designation part judging means judges whether the value sets up in the repeat number designation part, and the repeat designation rank judging means further judges, when judged the vale is set up in the repeat designation part, the rank designated in the repeat designation part of the mapping data as the repeat rank if the item designated in the item designation part of the mapping data corresponds to the item acquires from the basic hierarchy structure data, and, when judged the vale is NOT set up in the repeat designation part, judges the predetermined rank for the item designated in the item designation part as the repeat rank.

This enables to save the effort of setting the value of the item designation part in the case of regarding the item belonging to the upper rank than the item corresponding to the item designation part as the repeat item.

According to the invention, an input data acquiring means acquires the input data, and an input data setting means sets the input data related to the mapping data to the item corresponding to the item designation part of the mapping data.

This enables to set the input data to the corresponding item easily.

According to the invention, the input data is described in a input data describing file which includes one or plural input data describing area, the each input data describing area is identified by a row and a column, the mapping data is described in a mapping data describing file which includes one or plural mapping data describing area, the each mapping data describing area is identified by a row and a column, the input data and the mapping data is related according to the positional relation generated by the row and the column of the input data describing file and the mapping data describing file.

This enables to relate the input data to the mapping data easily.

According to the invention, a input data judging means judges whether the first input data is the same as the second input data, the first input data is the input data described in the input data describing area identified by a specific row and a specific column, the second input data is the input data described in the input data describing area identified by the front row and the same column, and the hierarchy structure data generating system does NOT further process the procedures of the hierarchy structure data generating means and the input data setting means about the item designated in the item designation part of the mapping data corresponding to the first input data when judged the first input data is the same as the second input data.

This enables to cut the some processes when the value of the certain input data.

According to the invention, a group judging means judges the item whose value described in the repeat designation part of the mapping data is the same to belong to the same group about the item described in the item designation part of the mapping data, a group input data judging means judges whether the value of the certain row is the same as the value of the front row about all of the input data corresponding to the mapping data which having the item belonging to the same group in the item designation part, and the hierarchy structure data generating system does NOT further process the procedures of the hierarchy structure data generating means and the input data setting means about the item designated in the item designation part of the mapping data corresponding to the first input data when judged the value of the certain row is the same as the value of the front row.

This enables to cut the some processes when the value of the targeted input data in the certain row is the same as in the front row.

The invention has been described above in the form of preferred embodiments. The terms used are for the purpose of explanation and not for limitation. Therefore, the embodiments may be modified within the scope of the appended claims without departing from the scope and spirit of the invention.

What is claimed is:

1. A hierarchy structure data generating system, which generates a hierarchy structure data where an item generating the hierarchy structure and a input data are related, said system comprising a memory which stores a computer program that when executed causes a processor to perform:
   a basic hierarchy structure data acquiring means that acquires a basic hierarchy structure data to designate a hierarchy structure generated by one or plural items;
   a mapping data acquiring means that acquires a mapping data comprising an item designation part and a repeat designation part, the item designation part that designates which input data relates to which item, the repeat designation part that designates in which rank of the hierarchy structure the item designated in the item designation part is output repeatedly;
   an item acquiring means that acquires the item from the basic hierarchy data;
   an item judging means that judges whether the item designated in the item designation part of the mapping data corresponds to the item acquires from the basic hierarchy structure data;
   a repeat rank judging means that judges the rank designated in the repeat designation part of the mapping data as the repeat rank if the item designated in the item designation part of the mapping data corresponds to the item acquires from the basic hierarchy structure data;
   a repeat item acquiring means that acquires the item corresponding to the repeat rank as the repeat item from the basic hierarchy structure data; and
   a hierarchy structure data generating means that generates the hierarchy structure data according to the acquired repeat item, the hierarchy structure data including plural items and the input data, the plural items generating the hierarchy structure, each of the plural items being related to the input data.

2. A hierarchy structure data generating system according to claim 1, wherein further comprising;
   a basic hierarchy structure data storage means that stores the basic hierarchy structure data.

3. A hierarchy structure data generating system according to claim 2, wherein further comprising;
   a mapping data storage means that stores the mapping data.

4. A hierarchy structure data generating system according to claim 1, wherein the mapping data further comprising;
   a repeat number designation part that designates how many times the item corresponding to the item designation part is output repeatedly,
   the hierarchy structure data generating system further comprising;
      a repeat number designation part acquiring means that acquires the repeat number designation part, and
   the hierarchy structure data generating means further generates the hierarchy structure data where the repeat item is output repeatedly the same number of times as the number of value in the repeat number designation part.

5. A hierarchy structure data generating system according to claim 4, wherein the repeat number acquiring means further sets "1" as the value of the repeat number designation part when judged the value does NOT set up in the repeat number designation part.

6. A hierarchy structure data generating system according to claim 1, wherein further comprising;
   a repeat designation part judging means that judges whether the value sets up in the repeat number designation part; and
   the repeat designation rank judging means further judges, when judged the value is set up in the repeat designation part, the rank designated in the repeat designation part of the mapping data as the repeat rank if the item designated in the item designation part of the mapping data corresponds to the item acquires from the basic hierarchy structure data, and, when judged the value is NOT set up in the repeat designation part, judges the predetermined rank for the item designated in the item designation part as the repeat rank.

7. A hierarchy structure data generating system according to claim 6, wherein one of the mapping data is related to one of the input data,
   the hierarchy structure data generating system further comprising;
      an input data acquiring means that acquires the input data, and
      an input data setting means that sets the input data related to the mapping data to the item corresponding to the item designation part of the mapping data.

8. A hierarchy structure data generating system according to claim 7, wherein the input data is described in a input data describing file which includes one or plural input data describing area, the each input data describing area is identified by a row and a column;
   the mapping data is described in a mapping data describing file which includes one or plural mapping data describing area, the each mapping data describing area is identified by a row and a column;
   the input data and the mapping data is related according to the positional relation generated by the row and the column of the input data describing file and the mapping data describing file.

9. A hierarchy structure data generating system according to claim 8, wherein further comprising;
  a input data judging means that judges whether the first input data is the same as the second input data, the first input data is the input data described in the input data describing area identified by a specific row and a specific column, the second input data is the input data described in the input data describing area identified by the front row and the same column;
  the hierarchy structure data generating system does NOT further process the procedures of the hierarchy structure data generating means and the input data setting means about the item designated in the item designation part of the mapping data corresponding to the first input data when judged the first input data is the same as the second input data.

10. A hierarchy structure data generating system according to claim 9, wherein further comprising;
  a group judging means that judges the item whose value described in the repeat designation part of the mapping data is the same to belong to the same group about the item described in the item designation part of the mapping data;
  a group input data judging means that judges whether the value of the certain row is the same as the value of the front row about all of the input data corresponding to the mapping data which having the item belonging to the same group in the item designation part; and
  the hierarchy structure data generating system does NOT further process the procedures of the hierarchy structure data generating means and the input data setting means about the item designated in the item designation part of the mapping data corresponding to the first input data when judged the value of the certain row is the same as the value of the front row.

11. A recording storage medium on which a program for a system to generate a hierarchy structure data, wherein the program causes a processor to perform: to acquire a basic hierarchy structure data to designate a hierarchy structure generated by one or plural items; to acquire a mapping data comprising an item designation part and a repeat designation part, the item designation part that designates which input data relates to which item, the repeat designation part that designates in which rank of the hierarchy structure the item designated in the item designation part is output repeatedly; to acquire the item from the basic hierarchy data; to judge whether the item designated in the item designation part of the mapping data corresponds to the item acquires from the basic hierarchy structure data; to judge the rank designated in the repeat designation part of the mapping data as the repeat rank if the item designated in the item designation part of the mapping data corresponds to the item acquires from the basic hierarchy structure data; to acquire the item corresponding to the repeat rank as the repeat item from the basic hierarchy structure data; and to generate the hierarchy structure data according to the acquired repeat item, the hierarchy structure data including plural items and the input data, the plural items generating the hierarchy structure, each of the plural items being related to the input data.

12. A method of generating a hierarchy structure data, the method being stored in a computer program that is stored in a memory that when executed causes a processor to perform:
  acquiring a basic hierarchy structure data to designate a hierarchy structure generated by one or plural items;
  acquiring a mapping data comprising an item designation part and a repeat designation part, the item designation part that designates which input data relates to which item, the repeat designation part that designates in which rank of the hierarchy structure the item designated in the item designation part is output repeatedly;
  acquiring the item from the basic hierarchy data;
  judging whether the item designated in the item designation part of the mapping data corresponds to the item acquires from the basic hierarchy structure data;
  judging the rank designated in the repeat designation part of the mapping data as the repeat rank if the item designated in the item designation part of the mapping data corresponds to the item acquires from the basic hierarchy structure data;
  acquiring the item corresponding to the repeat rank as the repeat item from the basic hierarchy structure data; and
  generating the hierarchy structure data according to the acquired repeat item, the hierarchy structure data including plural items and the input data, the plural items generating the hierarchy structure, each of the plural items being related to the input data.

* * * * *